United States Patent
Arora et al.

(10) Patent No.: US 12,277,137 B2
(45) Date of Patent: Apr. 15, 2025

(54) FRAMEWORK FOR ANALYZING, FILTERING, AND PRIORITIZING COMPUTING PLATFORM ALERTS USING FEEDBACK

(71) Applicant: Accenture Global Solutions Limited, Dublin (IE)

(72) Inventors: Akshay Arora, Delhi (IN); Krishna Mohan Roy, Varanasi / Uttar Pradesh (IN); Joydeep Dam, Bengaluru (IN); Jayant Pimpalkar, Prades (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/133,569

(22) Filed: Apr. 12, 2023

(65) Prior Publication Data
US 2024/0346037 A1 Oct. 17, 2024

(51) Int. Cl.
*G06F 16/26* (2019.01)
*G08B 29/18* (2006.01)
*G06F 16/00* (2019.01)

(52) U.S. Cl.
CPC .......... *G06F 16/26* (2019.01); *G08B 29/185* (2013.01)

(58) Field of Classification Search
CPC ...................................................... G06F 16/26
USPC ......................................................... 707/737
See application file for complete search history.

(56) References Cited

U.S. PATENT DOCUMENTS

| | | | | |
|---|---|---|---|---|
| 8,601,575 | B2 | 12/2013 | Mullarkey et al. | |
| 9,191,398 | B2 | 11/2015 | Bolzoni et al. | |
| 9,454,785 | B1 * | 9/2016 | Hunter | G06F 16/285 707/707 |
| 10,116,675 | B2 * | 10/2018 | Brown | H04L 41/069 707/707 |
| 10,394,612 | B2 * | 8/2019 | Grigoryan | G06F 9/5072 707/707 |
| 10,481,966 | B2 * | 11/2019 | Harutyunyan | G06F 11/327 707/707 |
| 10,491,454 | B2 * | 11/2019 | Grigoryan | H04L 41/064 707/707 |
| 10,560,309 | B1 * | 2/2020 | Chitalia | H04L 41/40 707/707 |
| 10,713,321 | B1 * | 7/2020 | Wen | G06N 20/20 707/707 |

(Continued)

*Primary Examiner* — Alexandria Y Bromell
(74) *Attorney, Agent, or Firm* — Polsinelli PC

(57) ABSTRACT

A computer-implemented method, system, and non-transitory, computer-readable medium that performs operations including obtaining alerts representing signals in a computing system and corresponding feedback indicators, indicating an association of the alert for the represented signal. The computing system can connect to a computing platform that includes a data mining engine. The operations include identifying a first subset of negative alerts, determining a first set of alert attributes, determining a type of model to analyze the alert attributes for signals represented by the alerts and analyzing, by the model, the first set of alert attributes to identify a subset of alert attributes with likelihoods representing alert attributes that caused the negative association of the alert. The operations include filtering the alerts to exclude a second subset of the alerts based on the likelihood of negative association, and providing for output, a set of alerts that exclude the second subset of the alerts.

20 Claims, 6 Drawing Sheets

(56) References Cited

U.S. PATENT DOCUMENTS

| | | | | |
|---|---|---|---|---|
| 10,901,746 | B2* | 1/2021 | Huang | G06F 11/0721 |
| | | | | 707/707 |
| 11,082,454 | B1* | 8/2021 | Carter | G06F 40/30 |
| | | | | 707/707 |
| 11,120,343 | B2* | 9/2021 | Das Gupta | G06N 5/025 |
| | | | | 707/707 |
| 11,237,897 | B2* | 2/2022 | Bhatia | G06N 20/20 |
| | | | | 707/707 |
| 11,269,751 | B2* | 3/2022 | Ohana | G06F 16/2246 |
| | | | | 707/707 |
| 11,290,473 | B2* | 3/2022 | Neuvirth | H04L 63/1441 |
| | | | | 707/707 |
| 11,329,863 | B1* | 5/2022 | Turgeman | H04L 41/0622 |
| | | | | 707/707 |
| 11,580,842 | B1* | 2/2023 | Hauser | G08B 21/182 |
| | | | | 707/707 |
| 11,586,972 | B2* | 2/2023 | Wang | G06F 16/2465 |
| | | | | 707/707 |
| 11,640,348 | B2* | 5/2023 | Bugdayci | G06F 11/301 |
| | | | | 709/224 |
| 11,647,035 | B2* | 5/2023 | Karpovsky | H04L 63/1425 |
| | | | | 726/23 |
| 2015/0207696 | A1 | 7/2015 | Zhang et al. | |
| 2016/0314423 | A1* | 10/2016 | Mole | G06Q 10/06393 |
| | | | | 707/707 |
| 2017/0295193 | A1* | 10/2017 | Yang | H04L 41/122 |
| | | | | 707/707 |
| 2018/0004948 | A1* | 1/2018 | Martin | H04L 63/1425 |
| | | | | 707/707 |
| 2018/0053207 | A1* | 2/2018 | Modani | G06Q 30/0244 |
| | | | | 707/707 |
| 2018/0218420 | A1* | 8/2018 | Cotton | G06F 21/6218 |
| | | | | 707/707 |
| 2019/0012374 | A1* | 1/2019 | Petroni | G06F 9/542 |
| | | | | 707/707 |
| 2019/0041843 | A1* | 2/2019 | Cella | G01M 13/045 |
| | | | | 707/707 |
| 2020/0089213 | A1* | 3/2020 | Cella | G06N 3/047 |
| | | | | 707/707 |
| 2022/0232353 | A1* | 7/2022 | Badros | G06F 16/9538 |
| | | | | 707/707 |
| 2023/0114603 | A1* | 4/2023 | Ravikant | G05B 23/0254 |
| | | | | 702/185 |
| 2023/0161661 | A1 | 5/2023 | Higgins et al. | |
| 2023/0362178 | A1* | 11/2023 | Pandey | H04L 41/064 |
| | | | | 707/707 |

* cited by examiner

FRAMEWORK FOR ANALYZING, FILTERING, AND PRIORITIZING COMPUTING PLATFORM ALERTS USING FEEDBACK

TECHNICAL FIELD

This specification relates generally to tracking and prioritizing signals across multiple observational hierarchies in a computing platform.

BACKGROUND

Computing platforms can analyze data to identify patterns in signals that travel across multiple observational hierarchies, also referred to as "layers" of a computing platform architecture. The layers of a computing platform can include a data storage layer configured to acquire data and apply pre-processing techniques, such as standardizing data formats. The computing platform also includes an analysis layer to apply algorithms to the data and generate time-series signals representing changes in the data over time. In some instances, the computing platform can also identify patterns in the signals, such as significant changes or other types of anomalies, and generate alerts to users. These users often leverage alerts to make adjustments in data collection and analysis, as well as to guide decisions regarding the systems that leverage the computing platform.

Computing platforms provide key visualizations to users with widespread applications in industries across commercial, industrial, and utility sectors. Computing platforms can include smart alert systems to provide alerts to users about changes in signals related to information technology (IT) infrastructure. For example, alerts can indicates changes in traffic volume, latency, and data monitoring status, across servers and systems in multiple geographical regions monitored by the computing platform. The computing platforms also include a consumption layer that provides data analytics of the signals through the users presented to the user, although prioritization of the alerts can be a difficult task due to the large volumes of data presented and complexity of multiple hierarchical layers of observations, e.g., signals representing data from different layers.

Due to the complexity of the signals represented in the alerts, many computing systems report numerous alerts to users that do not provide helpful insights for stakeholders to make decisions in response to the alerts. Furthermore, the volume of alerts provided to users often can be overwhelming and causes some alerts to be less useful in making decisions based on the patterns presented by the signals, even making said patterns difficult to detect. Some techniques for providing feedback to the presented alerts may exist, but these approaches may inadvertently misclassify critical alerts as unimportant, as the alerts can be presented in an ineffective way to the user. Alerts associated with negative feedback can cause poor adoption of the consumption layer among users, thereby resulting in reduced ability to address issues using the alerts. Issues presented by the alerts can indicate degraded performance and utility of the computing platform.

SUMMARY

This specification describes a computer-implemented method for improving tracking and analysis of signals across, by data mining alerts representing anomalies of signals in computing devices and systems. The method provides alert prioritization, filtering, and re-generation of alerts with improved accuracy using a data mining engine of a computing platform, which can be connected to the computing devices and systems. The computer-implemented method includes obtaining the alerts and associated feedback, in which feedback can include a user-indicated representation of the utility of a respective alert from users of the computing platform. These alerts can represent changes in signals transmitted throughout the hierarchies (e.g., layers) of the computing platform, in which the alerts can include multiple types of components (also referred to as "metadata" and "attributes" of the alert) to describe the signals.

The method includes mining data related to the alert and respective alert components with a data mining engine and applying models to determine likelihoods of the alert components causing the respective alert to receive a particular feedback indicator. The feedback indicators can be provided from users of computing devices and systems that generate the alerts, such as alerts with positive feedback indicators (also referred to as "positive alerts") and alerts with negative feedback indicators (also referred to as "negative alerts") for the computing platform. The method includes identifying components and/or combinations of components of the alerts with likelihoods of causing the alert to receive the respective feedback indicator. By identifying sources of the signal anomalies represented in the alerts, the method enables further improvement computing platforms to address subsets of signal anomalies with significant impact on the performance and throughput of the computing platform.

Some approaches for generating and providing alerts for computing systems can also inadequately present and/or provide alerts from the computing platform. By identifying the alert components that with highest likelihoods of driving the alert to receive feedback, the data mining engine can prioritize the alerts, determine a subset of output alerts based on the prioritization, and filter the output alerts for the computing platform, systems, and devices. The method includes configuring the data mining engine to select a type of model feedback indicators of the alerts.

Using deterministic and/or non-deterministic models, the data mining engine determines the subset of output alerts with associated likelihoods of driving the respective feedback indicator of the alert. By accurately identifying alert components driving the feedback the alert received, the method reduces the likelihood of a high priority alerts being ignored. The method can re-generate alerts by adjusting parameters from algorithms that originally generated the alert, to improve the likelihood of the alert receiving the feedback that efficiently indicates anomalies with higher priority. The efficient generation, filtering, and prioritization of alerts based on identified alert components that drive the associated feedback improves operability and efficiency of computing platforms by reduces processing loads from extraneous alert generation. The alert components can provide indication of priority for the alert and the respective feedback indicator of the alert. Identification and association of alert components to likelihoods of inducing respective feedback indicators of the alert can improve alert generation by reducing likelihoods of low priority signal anomalies reported to devices and users of computing platforms.

According to a first aspect, a computer-implemented method includes obtaining one or more alerts and feedback indicators corresponding to at least one of the one or more alerts, each of the one or more alerts representing a signal from one or more signals in a computing system, the computing system connected to a computing platform that includes a data mining engine, and each of the feedback indicators indicating a positive or negative association of the alert for the represented signal. The computer-implemented method includes identifying, based on the feedback indicator corresponding to a respective alert, a first subset of the one or more alerts that correspond to a subset of signals with negative feedback, determining, a first set of alert attributes that include data related to the subset of signals for the first subset of the one or more alerts, and determining, based on the feedback indicators and by a data mining engine, a model from a plurality of models of the data mining engine that is configured to analyze the respective alert attributes for signals represented by the one or more alerts. The computer-implemented method also includes analyzing, by the model of the data mining engine, the first set of alert attributes to identify a subset of alert attributes with corresponding likelihoods representing that one or more alert attributes caused the negative association of the alert represented by the respective signal, filtering, based on the subset of alert attributes and by the data mining engine, the one or more alerts to exclude a second subset of the one or more alerts with the highest likelihood of negative association, and providing, for output of the computing platform, at least one of the one or more alerts that exclude the second subset of the one or more alerts.

In some implementations, the computer-implemented method includes determining that the model includes determining a count of the one or more alerts, the count of the one or more alerts indicating a number of the one or more alerts with respective feedback indicators relative to the total number of the one or more alerts, comparing the count of the one or more alerts to a threshold value, and based on the comparison of the count of the one or more alerts to the threshold value, selecting the model from the plurality of models. In some implementations, the plurality of models can include at least one model that applies one or more of (i) statistical testing techniques, or (ii) machine learning techniques, to the first set of alert attributes to identify the subset of alert attributes.

In some implementations, the first set of alert attributes includes data related to the respective signal. The computer-implemented method can include identifying one or more algorithms that generated the first subset of the one or more alerts from the data related to the subset of signals, and adjusting parameters of the one or more algorithms based on the subset of alert attributes and their likelihoods.

In some implementations, analyzing the first set of alert attributes includes assigning the feedback indicator of the respective alert to each alert attribute of the alert, determining a frequency for each type of feedback indicator for the alert attributes of the alert, and determining a statistical likelihood of each alert attribute receiving the respective type of feedback indicator. The method can include comparing the statistical likelihood of each alert attribute to a threshold value, and assigning the feedback indicator to the alert attribute based on the comparison. In some implementations, the computer-implemented method can include determining that the statistical likelihood for any the respective alert attributes does not exceed the threshold value, determining a grouping of two or more alert attributes, and performing one or more statistical techniques using the grouping to identify a new statistical likelihood of the grouping of alert attributes receiving the respective type of feedback indicator. In some implementations, the threshold value represents a likelihood indicating an alert receiving a respective feedback indicator.

In some implementations, the computer-implemented method includes determining a probability of a positive feedback indicator being associated to each alert receiving a negative feedback indicator, identifying one or more neighboring alerts with positive feedback indicators for each alert that received the negative feedback indicator, determining a profile representing one or more common values of alert attributes of the one or more neighboring alerts, and adjusting one or more attributes of each alert that received the negative feedback indicator to the one or more common values from the profile. The computer-implemented method can include determining a score for each alert with one or more adjusted attributes, comparing the score for each alert with one or more adjusted attributes to a threshold value, and assigning the negative feedback alert to one or more alert attributes based on the comparison of the score and the threshold value for each alert. In some implementations, the computer-implemented method can include determining that the score for an alert with the one or more adjust attributes does not exceed the threshold value, determining a grouping of two or more alert attributes of the alert, and performing one or more machine learning techniques using the grouping to determine a new score for the grouping of alert attributes receiving the respective type of feedback indicator.

In an aspect, a system includes one or more computers and one or more computer memory devices interoperably coupled with the one or more computers and having tangible, non-transitory, machine-readable media storing one or more instructions that, when executed by the one or more computers, perform one or more operations. The operations include obtaining one or more alerts and feedback indicators corresponding to at least one of the one or more alerts, each of the one or more alerts representing a signal from one or more signals in a computing system, the computing system connected to a computing platform that includes a data mining engine, and each of the feedback indicators indicating a positive or negative association of the alert for the represented signal. The operations also include identifying, based on the feedback indicator corresponding to a respective alert, a first subset of the one or more alerts that correspond to a subset of signals with negative feedback, determining a first set of alert attributes that include data related to the subset of signals for the first subset of the one or more alerts, and determining, based on the feedback indicators and by a data mining engine, a model from a plurality of models of the data mining engine that is configured to analyze the respective alert attributes for signals represented by the one or more alerts. The operations can include analyzing, by the model of the data mining engine, the first set of alert attributes to identify a subset of alert attributes with corresponding likelihoods representing that one or more alert attributes caused the negative association of the alert represented by the respective signal, filtering, based on the subset of alert attributes and by the data mining engine, the one or more alerts to exclude a second subset of the one or more alerts with the highest likelihood of negative association, and providing, for output of the computing platform, at least one of the one or more alerts that exclude the second subset of the one or more alerts.

In some implementations, determining the model can include determining a count of the one or more alerts, the count of the one or more alerts indicating a number of the one or more alerts with respective feedback indicators relative to the total number of the one or more alerts, comparing the count of the one or more alerts to a threshold value, and based on the comparison of the count of the one or more alerts to the threshold value, selecting the model from the plurality of models.

In some implementations, the plurality of models includes at least one model that applies one or more of (i) statistical testing techniques, or (ii) machine learning techniques, to the first set of alert attributes to identify the subset of alert attributes. The first set of alert attributes can include data related to the respective signal.

In some implementations, the operations can include identifying one or more algorithms that generated the first subset of the one or more alerts from the data related to the subset of signals, and adjusting parameters of the one or more algorithms based on the subset of alert attributes and their likelihoods. In some implementations, analyzing the first set of alert attributes can include assigning the feedback indicator of the respective alert to each alert attribute of the alert, determining a frequency for each type of feedback indicator for the alert attributes of the alert, and determining a statistical likelihood of each alert attribute receiving the respective type of feedback indicator.

In some implementations, the operations include determining a probability of a positive feedback indicator being associated to each alert receiving a negative feedback indicator, identifying one or more neighboring alerts with positive feedback indicators for each alert that received the negative feedback indicator, determining a profile representing one or more common values of alert attributes of the one or more neighboring alerts, and adjusting one or more attributes of each alert that received the negative feedback indicator to the one or more common values from the profile.

In an aspect, a non-transitory, computer-readable medium storing one or more instructions executable by a computer system to perform operations including. obtaining one or more alerts and feedback indicators corresponding to at least one of the one or more alerts, each of the one or more alerts representing a signal from one or more signals in a computing system, the computing system connected to a computing platform that includes a data mining engine, and each of the feedback indicators indicating a positive or negative association of the alert for the represented signal. The operations can include identifying, based on the feedback indicator corresponding to a respective alert, a first subset of the one or more alerts that correspond to a subset of signals with negative feedback, determining, a first set of alert attributes that include data related to the subset of signals for the first subset of the one or more alerts, and determining, based on the feedback indicators and by a data mining engine, a model from a plurality of models of the data mining engine that is configured to analyze the respective alert attributes for signals represented by the one or more alerts. The operations can include analyzing, by the model of the data mining engine, the first set of alert attributes to identify a subset of alert attributes with corresponding likelihoods representing that one or more alert attributes caused the negative association of the alert represented by the respective signal, filtering, based on the subset of alert attributes and by the data mining engine, the one or more alerts to exclude a second subset of the one or more alerts with the highest likelihood of negative association, and providing, for output of the computing platform, at least one of the one or more alerts that exclude the second subset of the one or more alerts.

Particular embodiments of the subject matter described in this specification can be implemented so as to realize one or more of the following advantages.

Techniques for prioritizing alerts can provide numerous advantages by generating and providing alerts indicating anomalies in signals across complex computing systems with millions of connected devices. The monitoring and analysis of anomalies in signals of computing systems can include significant increases in signals representing latency, traffic, and related characteristics of the computing system. These signals indicate that the computing system is experiencing reduced performance and computational inefficiencies, which can be appropriately resolved if accurately identified and prioritized. By prioritizing alerts with significant impact to the computing platform, effective mitigation strategies to address the reduced performance of the computing platform are enabled and can be promptly performed. The identification of alert components with likelihoods of causing the alert to receive the respective feedback can indicate priority of the alerts and signal anomalies in computing systems, devices, and platforms.

Furthermore, the techniques described herein also provide a determination of a subset of the alerts from the numerous (e.g., millions) alerts that a computing platform receives during daily operation. The determined subset of alerts can improve adoption of the consumption layer of the computing platform by improving the utility, presentation, and insights of the alerts to the computing system (and respective computing devices) connected to the computing platform. These techniques can improve the efficiency of the computing system and platforms by reducing network bandwidth and computational cycles associated with generating and processing alerts. The widespread use of the complex computing systems with large volumes of signal data can incur significant computational, hardware, and environmental costs from data servers, computer networks, etc.

An advantage of data mining the alerts and determining of the subsets can include improving the computational efficiency of the computing systems by resolving high priority, high impact anomalies represented in the alerts. Reducing risks for inaccurate false positive feedback of high impact alerts can provide that the computing system can use fewer computing cycles during operation. Reducing the number of computing cycles for processing operations performed by the computing system also provides reduced heat generation, thereby resulting in improved operability and cooling for hardware associated to the computing system, such as servers. Improved cooling of hardware for the computing system can provide reduced computational cost by managing software loads performed by the hardware, also resulting in reduced carbon emissions from reduced electricity consumption. Data mining alerts of the computing system can provide reduced electric consumption across multiple layers of a computing system and platform, thereby reducing emitted carbon related to the operation of the computing system from hardware.

Given the widespread prevalence of data analytics, signals, computing platforms and system, the techniques described in this specification can reduce the complexity of resolving computational inefficiencies. The prioritized alerts provided by the computing platform enable the computing system to be robust in responding to anomalies of the computing system represented by the alerts. With robust anomaly detection and prioritization, computing systems leveraging the advantages of the computer-implemented method can achieve reduced carbon emissions by processing subsets of high priority alerts, compared to computing systems processing large volumes of alerts.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
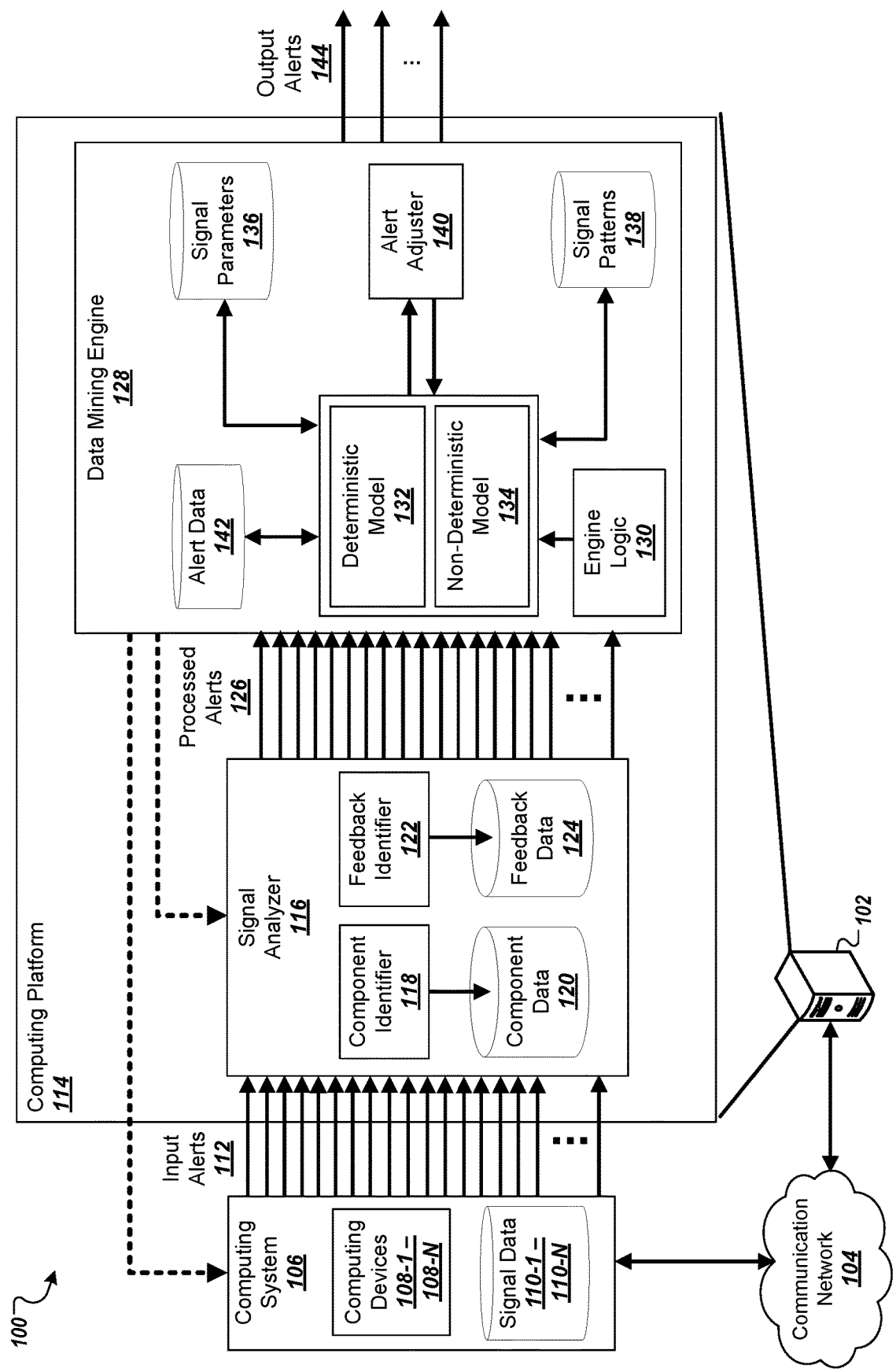
FIG. 1 illustrates an example computing platform prioritizing alerts.

FIG. 1 is a diagram showing an example of a computing platform environment 100 for analyzing and filtering alerts of from a computing system 106 using a computing platform 114. The computing system 106 can include computing devices 108-1-108-N, each device configured to generate and track signals throughout the computing system 106. The computing devices 108-1-108-N (collectively referred to as "computing devices 108") can perform algorithms and leverage computing hardware for the computing platform environment 100 to generate and track sets of signal data 110-1-110-N (collectively referred to as "signal data 110"), each set of alert data corresponding to a respective computing device in the computing system 106. The alerts of a computing system 106 can represent patterns and insights from complex signals, e.g., from signal data 110. The complex signals of the computing system 106 can include multiple components describing characteristics of the signal, e.g., signal type, algorithm associated with generating the signal, a quantity of increase/decrease related to the signal, timing information of the signal. The computing system 106 can be particularly well suited to support and perform applications with large volumes of datasets, e.g., healthcare, manufacturing, IT infrastructure.

For example, the computing platform environment 100 can be an IT infrastructure system that monitors signals related to data requests, latency, traffic, processing loads, server requests, etc. and provides alerts to the computing devices 108 connected (e.g., wirelessly, local area network) to the computing platform environment 100. An alert for an IT infrastructure system can describe changes in the monitored signals and indicate valuable data for the computing devices, e.g., provided for display, transmitted as a signal/message. An alert can indicate anomalous behaviors (e.g., observations) of the signals for a respective system. In some implementations, the computing platform environment 100 can be a manufacturing and/or electrical system that monitors equipment (e.g., boilers, electric grids, pumps) for multiple manufacturing plants and/or electrical systems, including operating characteristics for the equipment of the system.

The computing platform 114 receives input alerts 112 from the computing system 106 and analyzes the signal data represented in the input alerts 112 through the signal analyzer 116. The signal analyzer 116 can process the alerts by identifying signal components, e.g., by the component identifier 118, and feedback indicators, e.g., by the feedback identifier 122, and provide the processed alerts 126 to the data mining engine 128. The data mining engine 128 can leverage engine logic 130 to determine a type of model, e.g., deterministic model 132, non-deterministic model 134, to analyze the processed alerts 126 and provide the output alerts 144, e.g., through the alert adjuster 140. The alert adjuster 140 can perform numerous actions to adjust the processed alerts 126 and generate the output alerts 144, which can be provided (e.g., for display, as transmitted data, and so on) to computing devices, systems, servers, etc. For example, the alert adjust 140 can filter the alerts based on priority, e.g., importance based on the signal type, and/or severity, e.g., impact on the computing system 106. In some implementations, the alert adjuster 140 can features of the alert components such as sensitivity thresholds and parameters that generate the alerts to improve generation of additional alerts generated by computing systems and devices, e.g., computing system 106 and computing devices 108.

By mining data related to the alerts, the data mining engine 128 can provide output alerts 144 as a subset of the processed alerts 126 using learned signal patterns 138. Furthermore, the data mining engine 128 determines one or more components of the alerts that has the highest likelihood of causing the alert to receive/be indicated by a feedback indicator. In some implementations, the data mining engine 128 can provide updated parameters, e.g., through the alert adjuster 140, to regenerate signals and alerts to be analyzed further, e.g., by the signal analyzer 116, and/or to re-generate alerts, e.g., by the computing system 106, based on updated parameters.

The computing platform 114 is can be part of a server device 102 and can be configured to monitor and analyze alerts representing signals across multiple observational hierarchies, such as data sources, data formatting layers, data storage layers, analysis layers, consumption layers, etc. of the computing system 106. Alerts in the computing platform environment 100 can track numerous time-series signals and indicate signal patterns, e.g., changes in signal behavior over a period of time. Furthermore, the server device 102 can be connected to the computing system 106 by a communication network 104, e.g., a wide area network, local area network, wireless connection. The server device 102 can be a server farm, cloud architecture system, server, etc. that can be connected to one or more other computing devices, e.g., computing system 106, computing devices 108.

The computing platform 114 can receive numerous alerts (e.g., millions) from input alerts 112 in short periods of time (e.g., a millisecond), while monitoring an environment for day-to-day operations of the computing system 106. In some implementations, the input alerts 112 can include data indicating the observational hierarchy (e.g., a layer) of the computing platform environment 100 for which the signal was generated. In some implementations, the input alerts 112 can include components identifying data that describes the observational hierarchy for which an alert was detected. The input alerts 112 generated by the computing devices 108 of the computing system can include associated feedback from the one or more computing devices.

An alert of the input alerts 112 can include a feedback indicator associated with the alert, e.g., indicating a positive or negative trend of the signal represented in the alert. For example, the alert with a positive feedback indicator can indicate that the signal is demonstrating a positive trend, i.e., an association with a positive characteristic of the signal such as direction of change, location of the signal in a computing architecture layer, presence of the signal. As another example, an alert can include a negative feedback indicator indicating that the signal is demonstrating a negative trend, e.g., an association with a negative characteristic of the signal. The input alerts 112 can be provided to the computing platform of the server device 102, e.g., by communication network 104. An alert can also include narration data, e.g., a description of summarizing signal, that includes a quantity, label, or type of data indicating for the alert, as an example of an alert component.

Positive alerts can include narrations describing changes in signals of the computing platform that indicate the change corresponds to desired performance of the computing platform. Negative alerts can include narrations describing changes in signals of the computing platform that indicate the change corresponds to a decrease in performance of the computing platform. For example, an increase in a signal can be negatively associated upon exceeding a threshold value, e.g., latency above 100 milliseconds, whereas an increase in the same signal below the threshold value can be acceptable, e.g., latency below 100 milliseconds, for the computing systems and devices. The data mining engine 128 can leverage models such as deterministic model 132 and/or non-deterministic model 134 to identify thresholds to effectively control generation of the alerts based on the alert components and reduce likelihoods of generating extraneous alerts.

Table 1 below describes an example set of alerts (e.g., input alerts 112), with an associated feedback indicator and summary of the alert provided to a computing device. The summary of an alert can also be referred to as the alert narration. As illustrated below, "Alert 1" includes a value of "1" for feedback, indicating positive feedback to the alert, and summarizes a positive change in "Signal1", e.g., increasing by 14 percent in Region A. As an example, "Signal1" can indicate an amount of traffic, latency, request, and so on, of a computing platform. Although an increase in "Signal2" is illustrated as being negatively associated, in some implementations, a decrease of a signal of an alert can be associated with positive feedback, e.g., reducing latency IT infrastructure.

TABLE 1

| Alert | Feedback | Summary |
| --- | --- | --- |
| 1 | 1 (Positive) | Signal1 increased by 14 percent in Region A |
| 2 | 0 (Negative) | Signal2 decrease by 12 percent in Region B |
| ... | ... | ... |
| N | ... | ... |

The feedback associated with the input alerts 112 can be generated by computing devices 108. For example, the computing devices 108 can generate one or more alerts from the signal data 110 and provide the alert for display to a user. The computing devices 108 can include a mechanism for user input, e.g., a user can label the alert as positive or negative through interacting with one or more computing devices 108. As an example, the mechanism for providing user feedback to alerts can include a user interface, in which the user can input feedback indicators by any appropriate means of the computing devices 108. In some implementations, the computing devices 108 can be programmed to assign feedback indicators to alerts based on feedback rules provided by a user. For example, a rule can be individually applied to an alert based on a threshold value of change, presence of a signal component, signal type, etc. In some implementations, some or all of the alerts may not include a feedback indicator, e.g., no feedback associated with the alert.

Although the computing system 106 can provide feedback indicators, in some implementations, users can be presented with large volumes of near real-time alerts in short time instances. Large volumes of alerts can undermine the importance of some alerts over others, and in some implementations, the input alerts 112 can be incorrectly associated. For example, a negatively associated alert can be marked as such due to the presentation of the alert to the user, instead of the content of the signal pattern represented by the alert.

In some implementations, the computing platform 114 can obtain the input alerts 112 from the computing system 106, e.g., by retrieving the alerts from one or more computing devices. The computing system 106 can be configured to push the input alerts 112 to the computing platform 114, although in some implementations, the computing system 106 can provide the input alerts 112 in response to a request by the computing platform 114 for alerts.

Upon obtaining input alerts 112, the computing platform 114 can analyze signal data, e.g., signal data 110, from the input alerts 112 through the signal analyzer 116. The signal analyzer 116 can identify components of signals from the input alerts 112 using the component identifier 118, and store data, e.g., signal metadata, signal data, in component data 120. The signal analyzer 116 can also identify feedback indicators of the input alerts 112 using the feedback identifier 122, and store data, e.g., feedback indicators, in feedback data 124. In some implementations, the data mining engine 128 can adjust data stored in component data 120 and feedback data 124, e.g., by filtering and/or prioritizing alerts.

Table 2 below describes an example set of alerts (e.g., input alerts 112) processed by the component identifier 118 and feedback identifier 122 of the signal analyzer 116. As illustrated below, the columns indicate types of alert components related to the signal of the alert. For example, "Alert 1" includes alert components "Configuration Metadata1", "Configuration Metadata2", "Configuration Metadata3", "Algorithm Metadata1", "Algorithm Metadata2", and "Algorithm Metadata3", although alerts can have any number of components describing the signal. The alert component data describing configuration metadata of the signal can include the signal type, signal hierarchy, and magnitude of change. For example, the signal type can indicate the type of signal indicated, e.g., included in the generation of the alert. The signal hierarchy can indicate a layer, e.g., consumption layer, analysis layer, of the computing system 106. In some implementations, a component of the alert can be a null value, e.g., in which the data mining engine 128 can update the respective component of the alert, e.g., in the component data 120, and the alert. Alert components can be referred to as attributes and can include attributes of signals represented by the alerts. The signal attributes can include parameters used as input for algorithms to generate the alerts, and can also include the type of the algorithm that generated the alert.

TABLE 2

| Alert | Configuration Metadata1 | Configuration Metadata2 | Configuration Metadata3 | Algorithm Metadata1 | Algorithm Metadata2 | Algorithm Metadata3 |
|---|---|---|---|---|---|---|
| 1 | Signal1 | Hierarchy1 | Increase | Algorithm1 | High | TRUE |
| 2 | Signal2 | Hierarchy1 | Increase | Algorithm1 | High | TRUE |
| 3 | Signal3 | Hierarchy2 | Decrease | Algorithm1 | Medium | TRUE |
| 4 | Signal2 | Hierarchy1 | Decrease | Algorithm1 | High | TRUE |
| 5 | Signal3 | Hierarchy2 | Increase | Algorithm1 | Medium | TRUE |
| 6 | Signal3 | Hierarchy1 | Decrease | Algorithm1 | High | TRUE |
| 7 | Signal1 | Hierarchy1 | Decrease | Algorithm1 | High | TRUE |
| 8 | Signal2 | Hierarchy2 | Decrease | Algorithm1 | Medium | TRUE |
| 9 | Signal1 | Hierarchy1 | Decrease | Algorithm1 | Medium | TRUE |
| ... | ... | ... | ... | ... | ... | ... |
| N | SignalN | HierarchyN | ... | AlgorithmN | ... | ... |

Alert component data describing algorithm metadata of the signal can include algorithm name/type, sensitivity, and seasonality. In some implementations, alert component data such configuration metadata and/or algorithm metadata can be a value, categorical label, binary value, etc. For example, the algorithm name and/or type can indicate the type of algorithm that generated the alert based on the signal, e.g., signal characteristics. The algorithm sensitivity can be a categorical label indicating the algorithm's sensitivity to anomalous patterns such as changes in value and/or interruptions in service. Algorithm sensitivity can be a threshold value such that if the signal exceeds or falls short of the threshold, an alert can be triggered for the signal. The algorithm seasonality can be an indicator describing if the alert considers for expected trends or patterns of the signal. As an example, some signals can include expected variations in signal value, e.g., latency and traffic in an IT system, during particular time periods. Alerts generated during expected variations indicated by algorithm seasonality, can be extraneously generated and/or provided to users.

The signal analyzer 116 can provide processed alerts 126 to the data mining engine 128, which include the alert components and feedback indicators of the input alerts 112. The data mining engine 128 can utilize engine logic 130 to determine a type of model based on the volume (e.g., a number) of feedback indicators provided for the processed alerts 126. The process of determining the type of model, e.g., deterministic model 132 and/or non-deterministic model 134, to mine data from the processed alerts 126 is described in FIG. 2 below. In some implementations, multiple models and/or a mixture of models with different types can be leveraged to mine alert data to determine respective alert components that drive an alert to receive particular feedback. In other words, the deterministic model 132 and/or non-deterministic model 134 can determine likelihoods of each alert component of the alert causing the alert to receive a respective feedback indicator. The data mining engine 128 can determine (e.g., identify) an alert component of the respective alert with the highest likelihood, e.g., among all of the alert components of the alert, of causing the alert to receive the respective feedback indicator.

The data mining engine 128 can execute engine logic 122 to determine which models to use, e.g., from deterministic model 132 and/or non-deterministic model 134. Examples of deterministic models 132 can include statistical techniques to analyze the alerts and identify alert components that cause the alerts to receive the associated feedback. Examples of the non-deterministic model 134 machine learning techniques, e.g., supervised, unsupervised, and hybrid learning techniques. Further description of the data mining process performed by the deterministic model 132 and by the non-deterministic model 134 is described in FIGS. 3A and 3B, respectively.

The data mining engine 128 can analyze the alert components of the processed alerts 126 and stored parameters, e.g., values, labels, metadata, in signal parameters 136. As another example, the data mining engine 128 can access signal parameters 136 from previous model iterations to learn relationships between alert components of alerts and the associated alert feedback indicators. In some implementations, the data mining engine 128 can also determine signal patterns 138 between iterations of model runs, e.g., the deterministic model 132 and/or non-deterministic model 134, in which the signal patterns 138 describe alert components with high likelihoods of causing alerts to receive the respective feedback indicator.

In some implementations, the data mining engine 128 can mine data related to the processed alerts 126 and adjust values/labels for generating the alerts by providing updated signal parameters 136 to the computing system 106. As discussed above, the computing system 106 can generate alerts based on algorithms performed by computing devices 108 to analyze signals of the computing system 106. The data mining engine 128 can mine data related to the alerts and signals represented by the alerts, and store the results in alert 142, e.g., to generate training examples. The data mining engine 128 can also store learned relationships from statistical tests performed by the deterministic model 132 and machine learning techniques applied by the non-deterministic model 134 in alert data 142, e.g., for further processing and component determination. In some implementations, the data mining engine 128 can apply statistical analysis and learned relationships between alert components and the respective feedback indicators to adjust alerts, e.g., by determining a subset of the alerts with greatest likelihoods of association with the feedback indicator.

The alert adjuster 140 can be used to filter and/or prioritize alerts based on The data mining engine 128 generates output alerts 144 based on learned relationships between signal parameters 136, signal patterns 138, and processed alerts 126. For example, the alert adjuster 140 can filter the processed alerts 126 and provide the output alerts 144 as subset of the processed alerts 126. The subset of the processed alerts 126 can include adjusted alerts with a particular feedback indicator. For example, the output alerts 144 can include alerts from processed alerts 126 that were originally negatively associated alerts but then adjusted to be positively associated alerts to identify of one or more alert components causing the original association of the alert with negative feedback. In some implementations, data mining engine 128 can re-order the processed alerts in a prioritized order based on the mined data of the alerts, e.g., alert components. As an example, the alert adjust 140 of the data mining engine 128 can adjust and filter alerts to obtain a subset of alerts, e.g., output alerts 144, with negatively associated alerts that were extraneously generated by the computing system 106 being removed. By identifying the components driving the alert to cause the association of the alert to the respective feedback indicator, the alert adjuster 140 can determine parameters to adjust for generating the alerts.

The data mining engine 128 can provide identified alert components of the alerts, e.g., from the deterministic model 132 and/or the non-deterministic model 134, that drive the associated feedback indicator to the alert adjuster 140. The alert adjuster 140 can determine rules that include adjusting threshold values and assigning (e.g., overriding) feedback indicators based on identified alert components to reduce volumes of alerts generated. For example, the alert adjuster 140 can control sensitivity thresholds for the alerts being generated by the computing system 106 to reduce alerts with low priorities, e.g., relative to high alerts with significant impact to increased processing loads of the computing system 106. The alert adjuster 140 can also leverage identified combinations of alert components from models to proactively assign feedback indicators and prioritize alerts based on the identified combinations, thereby reducing processing loads and improving computational efficiencies of the computing platform 114.

Furthermore, the output alerts 144 can be provided to one or more computing devices, systems, servers that can be connected to the computing platform 114, e.g., by wireless communication. By providing a subset of the processed alerts 126 as output alerts 144, the data mining engine 128 can provide computational benefits to computing systems by reducing volumes of alerts provided to connected computing devices. A computing system 106 leveraging a computing platform 114 with a data mining engine 128 can provide output alerts 144 that are prioritized based on impact to the computing system and improve computational efficiency, e.g., by highlighting alerts indicating anomalies in the signals of the computing system. The data mining engine 128 can provide output alerts 144 with improved accuracy by increasing the rate of correctly identifying signal trends that can be positively associated, e.g., assigning a lower priority for less important signal trends/patterns and higher priority for more important signal trends/patterns. The data mining engine 128 can also provide output alerts with improved accuracy by decreasing the rate of false negatives, as some alerts are incorrectly associated with negative feedback indicators due to presentation, formatting, and/or order of the alert components. Description of the data mining process performed by the data mining engine 128 is described in reference to FIG. 4.

Figure 2:
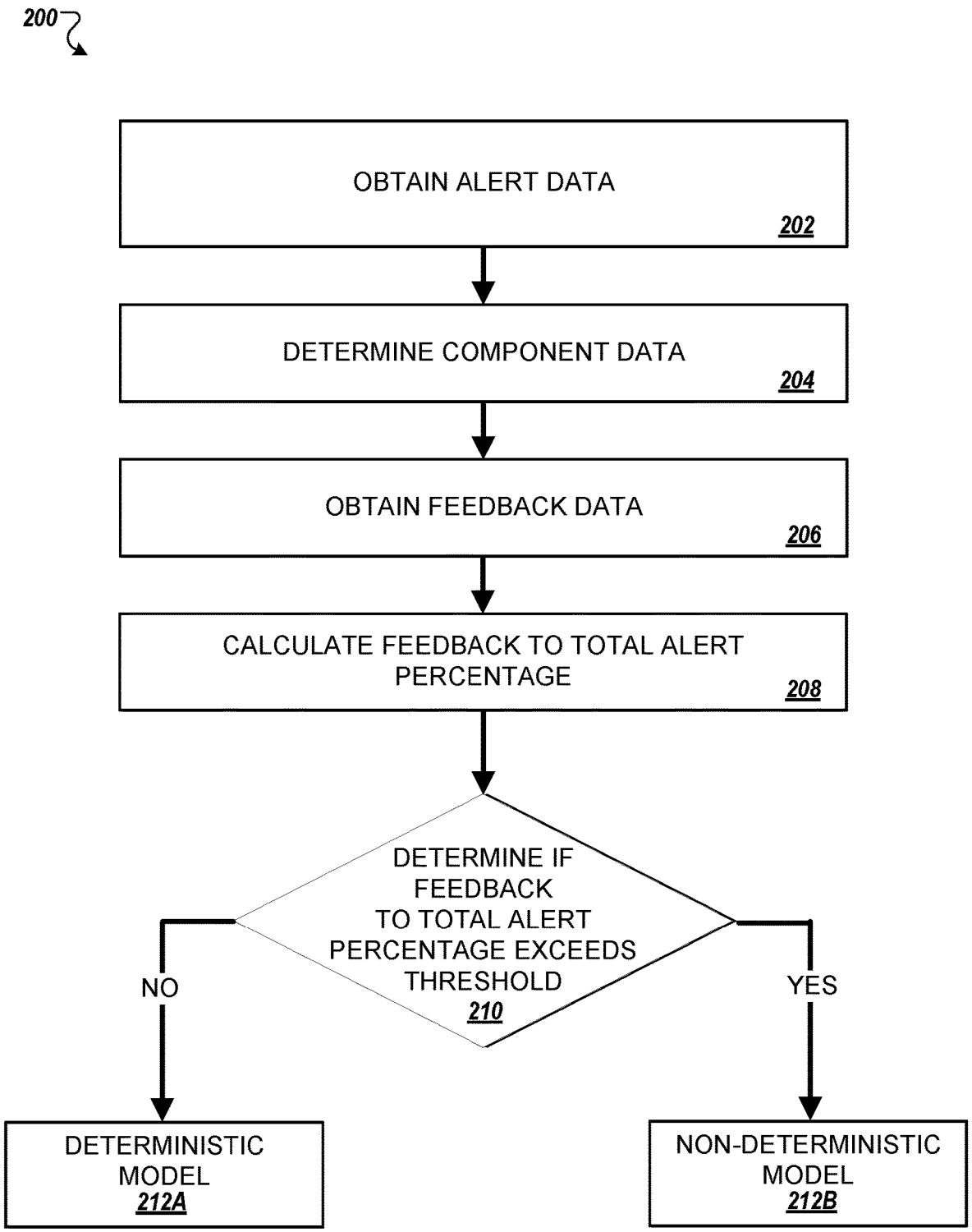
FIG. 2 is a flow diagram showing an example process performed by the data mining engine.

FIG. 2 is a diagram illustrating a model determination process 200 performed by a data mining engine, e.g., the data mining engine 128 described in reference to FIG. 1 above, to determine a type of model to analyze alerts and associated feedback. Briefly, the process 200 includes the steps of obtaining alert data (202), determining component data (204), obtaining feedback data (206), calculating a number of alerts with associated feedback as a percentage relative to the total number alerts (208), and determining if the percentage representing alerts associated feedback to total alerts exceeds a threshold (210). At step 210, the process 200 includes a branch between step 212a and step 212b depending upon the determination of the feedback threshold being met. In other words, the data mining engine 128 can perform the process 200 to apply a deterministic model (212A) or a non-deterministic model (212B), based on the determination at step 210 of the feedback threshold being met.

The process 200 includes the step of the data mining engine obtaining alert data (202). For example, the step 202 can include obtaining the narratives of each alert in a set of input alerts, e.g., input alerts 112. In some implementations, obtaining the alert data can include determining a label indicating an identification of the alert, e.g., an alert ID.

The process 200 includes the step of the data mining engine determining alert components from the alert data (204). For example, the step 204 can include determining metadata related to the alert, as well as any signal represented by the alert. Determining the alert components can include extracting metadata related to the alert such as type of signal, hierarchy of the signal, and magnitude of change of the signal represented in the alert. One or more of the alert components can also include algorithm metadata related to the alert, e.g., the type of algorithm that generated the alert, sensitivity of detection for anomalies in the signal leading to the alert being generated, and seasonality of the alert.

The process 200 includes the step of the data mining engine obtaining feedback data corresponding to the alerts (206). The step 206 can include retrieving feedback indicators associated with each alert in a set of input alerts for the data mining engine to analyze and determine a respective subset of output alerts. In some implementations, the step 206 can include feedback indicators with a positive or negative indicator. In some implementations, feedback indicators can be represented by binary values, e.g., a value of "1" representing positive feedback, and a value of "0" representing negative feedback. In some implementations, feedback indicators can be represented using discrete values, e.g., a value of "1" representing positive feedback, a value of "−1" representing negative feedback, and a value of "0" representing a lack of feedback indicator for the alert. As another example, the lack of a feedback indicator for an alert can be described by a null (e.g., no value, a value representing null) for the alert.

The process 200 includes the step of the data mining engine calculating a number of alerts with associated feedback as a percentage relative to the total number alerts (208). The step 208 can include determining a number of alerts with a respective feedback indicator, and determining a total number of alerts. In some implementations, the step 208 can include determining a total number of alerts with any feedback indicator (e.g., positive or negative).

The process 200 includes the step of the data mining engine determining if the percentage representing alerts associated feedback to total alerts exceeds a threshold (210). The step 210 can include determining a threshold value based on the total number of alerts obtained from the computing system connected to the computing platform. In some implementations, the threshold value can be based on an amount and/or type of alert data available to the data mining engine. Upon determining that a ratio or percentage of alerts with feedback indicators is below the threshold value, the data mining engine can utilize the deterministic model (212A), e.g., deterministic model 132. Upon determining that a ratio or percentage of alerts with feedback indicators exceeds the threshold value, the data mining engine can utilize the non-deterministic model (212B), e.g., non-deterministic model 134.

In some implementations, the data mining engine can determine that a deterministic model, e.g., rules-based statistical techniques, can be better suited for mining alerts and alert data based on the feedback indicators. In addition to insufficient i.e., less than a threshold number of feedback indicators relative to the total number of alerts, the data mining engine can determine the deterministic model based on data related to the signal, e.g., data quality, availability of signal metadata. In some implementations, the data mining engine can determine that a non-deterministic model, e.g., machine learning techniques, can be better suited for mining alerts and alert data based on the feedback indicators. The data mining engine can determine that the non-deterministic model is better suited for mining alerts based on signal complexity, volume, presence of particular signal attributes, and types of algorithms that generate alerts.

Figure 3A:
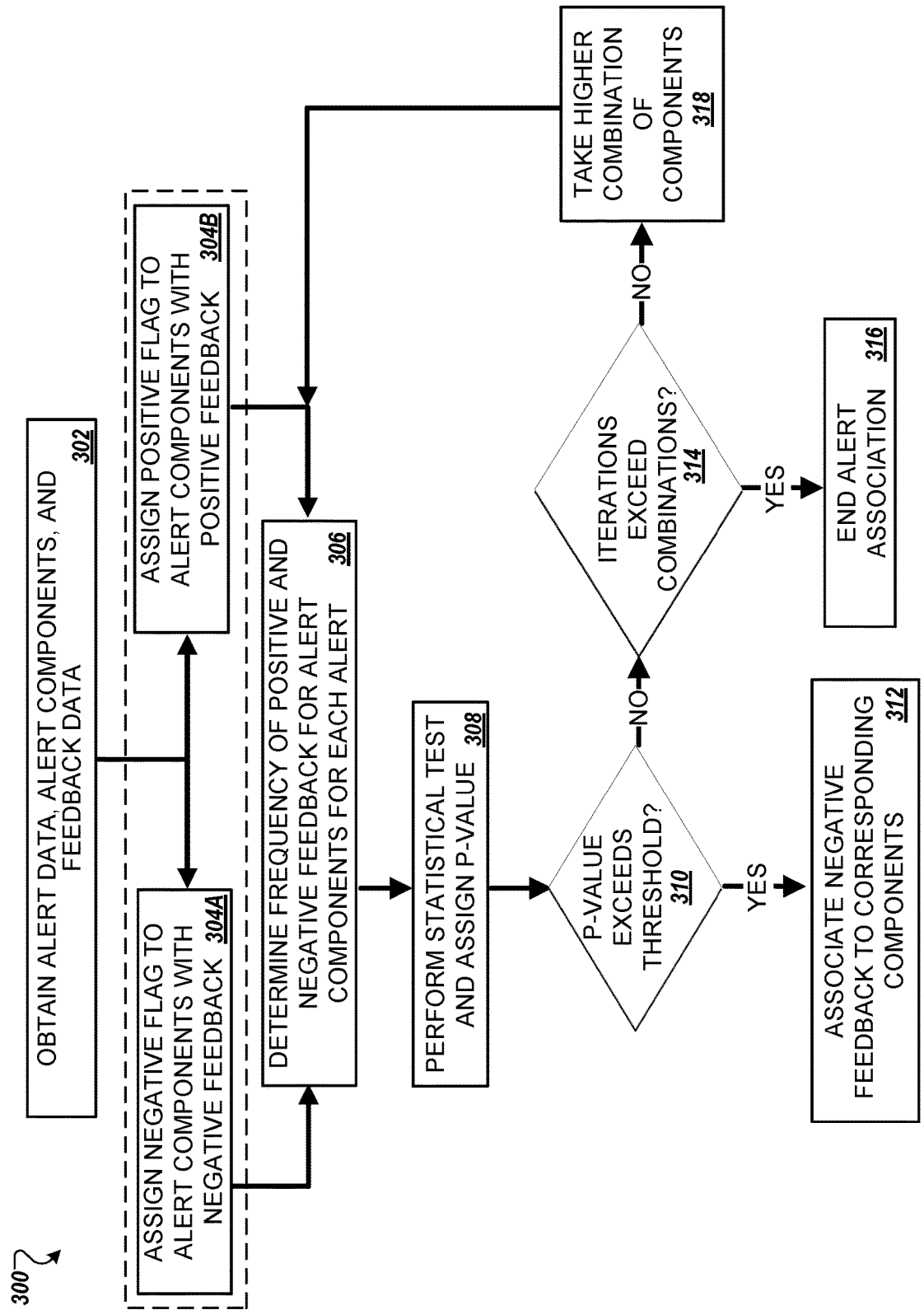
FIGS. 3A-3B are flow diagrams showing example processes for mining alert data.

FIG. 3A is a diagram illustrating a data mining process 300 performed by a data mining engine (e.g., the data mining engine 128 described in reference to FIG. 1 above) using a deterministic model. Briefly, the process 300 includes the steps of obtaining alert data including alert components and the respective feedback data (302), assigning the respective feedback indicators for the alert to all of the alert components (304A, 304B), determining frequencies of respective feedback indicators for each alert component (306), and performing statistical testing using the determined frequencies and assigning p-values for the alert components (308). The process 300 also include determining that the p-value for each alert component exceeds a threshold value (310) and branches to associating a negative feedback indicator to corresponding alert components with p-values exceeding the threshold value (312). Upon determining that the p-value does not exceed the threshold value, the process 300 branches to determining if the number of iterations performed by the deterministic model exceed a total number of combinations of the alert components (314). If the number of iterations does not exceed the number of combinations, the process 300 includes taking higher combinations of alert components (318) and repeating steps of the process 300, including ending association of alert components (316).

The process 300 includes the step of the data mining engine obtaining alert data including alert components and the respective feedback data (302). The data mining engine can obtain alerts and alert data by retrieving the alerts, e.g., from a computing system. In some implementations, the data mining engine can continually receive alerts in a computing platform environment. In some implements, computing devices can be connected to the data mining engine and the data mining engine can directly receive the alerts from computing devices. The data mining engine can also receive the feedback indicators as feedback data for the respective alerts. The alert data can include narratives describing an anomaly in signals from computing systems, e.g., determined by algorithms processing signal data.

The step 302 includes the data mining engine obtaining alerts, alert data, and feedback data as shown in Table 3 below.

TABLE 3

| Alert | Feedback | Summary |
|---|---|---|
| 1 | 1 (Positive) | Signal1 increased by 14 percent in Region A |
| 2 | 0 (Negative) | Signal2 decreased by 20 percent in Region B |
| ... | ... | ... |
| N | ... | ... |

The step 302 includes the data mining engine obtaining alert metadata for the alerts, e.g., including attributes of signals, as shown in Table 4 below. The alert component data can include configuration metadata such as latency, data transfer, regions, throughput rate, and changes in throughput rate for signals of a computing system. The alert component data can also include algorithm metadata for signals such as seasonality indicators, moving averages of signal values, standard deviation of signal values, and variances of signal values.

TABLE 4

| Alert | Configuration Metadata1 | Configuration Metadata2 | Configuration Metadata3 | Algorithm Metadata1 | Algorithm Metadata2 | Algorithm Metadata3 |
|---|---|---|---|---|---|---|
| 1 | Signal1 | Hierarchy1 | Increase | Algorithm1 | High | TRUE |
| 2 | Signal2 | Hierarchy1 | Increase | Algorithm1 | High | TRUE |
| 3 | Signal3 | Hierarchy2 | Decrease | Algorithm1 | Medium | TRUE |
| 4 | Signal2 | Hierarchy1 | Decrease | Algorithm1 | High | TRUE |
| 5 | Signal3 | Hierarchy2 | Increase | Algorithm1 | Medium | TRUE |
| 6 | Signal3 | Hierarchy1 | Decrease | Algorithm1 | High | TRUE |
| 7 | Signal1 | Hierarchy1 | Decrease | Algorithm1 | High | TRUE |
| 8 | Signal2 | Hierarchy2 | Decrease | Algorithm1 | Medium | TRUE |
| 9 | Signal1 | Hierarchy1 | Decrease | Algorithm1 | Medium | TRUE |
| ... | ... | ... | ... | ... | ... | ... |
| N | SignalN | HierarchyN | ... | AlgorithmN | ... | ... |

The process 300 includes the step of assigning the respective feedback indicators for the alert to all of the alert components (304A, 304B). The data mining engine can assign the feedback indicator for an alert to the respective alert components, e.g., component metadata and/or algorithm metadata. In other words, the data mining engine assigns feedback across alert component data and for one or more signals represents in the alerts, e.g., "Signal1", "Signal2", and "Signal3". For brevity, configuration metadata can be referred to as "CM", algorithm metadata can be referred to as "AM", signal can be referred to as "Sig", signal hierarchy can be referred to "Hier", and algorithm can referred to as "algo", as shown in Table 5 below.

TABLE 5

| Alert | CM1 Sig1 | CM1 Sig2 | CM1 Sig3 | CM2 Hier1 | CM2 Hier2 | CM3 ↑ | CM3 ↓ | AM1 Algo. 1 | AM2 High | AM2 Medium | AM3 True | Feedback |
|---|---|---|---|---|---|---|---|---|---|---|---|---|
| 1 | +1 |    |    | +1 |    | +1 |    | +1 | +1 |    | +1 | 1 |
| 2 |    | +1 |    | +1 |    | +1 |    | +1 | +1 |    | +1 | 1 |
| 3 |    |    | +1 |    | +1 |    | 1  | +1 |    | +1 | +1 | 1 |
| 4 |    | -1 |    | -1 |    |    | -1 | -1 | -1 |    | -1 | -1 |
| 5 |    |    | +1 |    | +1 | +1 |    | +1 |    | +1 | +1 | 1 |
| 6 |    |    |    | -1 | -1 |    | -1 | -1 | -1 |    |    | -1 |
| 7 | +1 |    |    | +1 |    |    | +1 | +1 | +1 |    | +1 | 1 |
| 8 |    | -1 |    |    | -1 |    | -1 | -1 |    | -1 | -1 | -1 |
| 9 | +1 |    |    | +1 |    |    | +1 | +1 |    | +1 |    | 1 |

As an example, "Alert 1" in the first row of data for Table 4 received a positive feedback indicator, e.g., referring to the first row of data for Table 3, and therefore includes positive feedback indicators for each alert component of "alert 1" e.g., "Configuration Metadata1", "Configuration Metadata2", "Configuration Metadata3", "Algorithm Metadata1", "Algorithm Metadata2", and "Algorithm Metadata3" for the respective alert. As another example, "Alert 4" in the fourth row of data for Table 4 received a negative feedback indicator, e.g., referring to the fourth row of data for Table 3, and therefore includes positive feedback indicators for each alert component of "alert 4" e.g., "Configuration Metadata1", "Configuration Metadata2", "Configuration Metadata3", "Algorithm Metadata1", "Algorithm Metadata2", and "Algorithm Metadata3" for the respective alert.

For example, all of the alert components with respective data values can be assigned the feedback indicator of the alert, e.g., provided by a user through a computing device, generated by a computing device. In some implementations, the data mining engine can exclude a subset of the alert components for processing to achieve additional computational savings, e.g., by iteratively processing the alert data and the feedback.

The process 300 includes the step of determining frequencies of respective feedback indicators for each alert component (306). For example, the data mining engine can filter for a subset of alerts based on a respective feedback indicator, e.g., filtering for alerts with negative feedback. As shown in Table 3 and Table 5, a number of alerts can be indicated as positive alerts, e.g., "alert 1", "alert 2", "alert 3", "alert 5", "alert 7", "alert 9", and a number of alerts can be indicated as negative alerts, e.g., "alert 4", "alert 6", and "alert 8". As an example, negative alerts such as "alert 4", "alert 6", and "alert 8" are shown in Table 6 below.

TABLE 6

| Alert | CM1 Sig1 | CM1 Sig2 | CM1 Sig3 | CM2 Hier1 | CM2 Hier2 | CM3 ↑ | CM3 ↓ | AM1 Algo. 1 | AM2 High | AM2 Medium | AM3 True | Feedback |
|---|---|---|---|---|---|---|---|---|---|---|---|---|
| 4 |    | -1 |    | -1 |    |    | -1 | -1 | -1 |    | -1 | -1 |
| 6 |    |    | -1 | -1 |    |    | -1 | -1 | -1 |    |    | -1 |
| 8 |    | -1 |    |    | -1 |    | -1 | -1 |    | -1 | -1 | -1 |

The data mining engine can determine frequencies of feedback indicators for each component, by analyzing each component and determining a frequency in which a component was assigned the respective feedback indicator. The data mining engine can process each alert and compute the frequency for each alert component. In other words, the data mining engine can computing the frequency of the feedback indicator being assigned across all alert components, e.g., alert metadata, signal metadata. As an example, the data mining engine can determine assignment frequencies of feedback indicators across the metadata for a negative alert such as "Alert 4", as shown in Table 7 below. The data mining engine determines frequencies for the alert components for "Alert4" can include "Configuration Metadata1" indicating "Signal 2", "Configuration Metadata2" indicating "Hierarchy1", "Algorithm Metadata1" indicating "Algorithm1", "Algorithm Metadata2" indicating "High", and "Algorithm Metadata3" indicating "True".

TABLE 7

Alert #4

| Metadata/Alert Component | Positive | Negative |
|---|---|---|
| Configuration Metadata1: Signal2 | 1 | 2 |
| Configuration Metadata2: Hierarchy1 | 4 | 2 |
| Algorithm Metadata1: Algorithm1 | 6 | 3 |
| Algorithm Metadata3: True | 6 | 3 |
| Algorithm Metadata2: High | 3 | 2 |

As described in Table 7 above, the data mining engine can determine that alert components such as "Configuration Metadata1" of "Signal 2" from "Alert 4" was assigned one positive feedback indicator and two negative feedback indicators.

The process 300 includes the step of performing statistical testing using the determined frequencies and assigning p-values for the alert components (308). For example, the data mining engine can utilize deterministic models that employ statistical techniques for analyzing each alert component. Examples of statistical techniques can include parametric testing such as t-test, ANOVA testing, MANOVA testing, independent t-testing, paired t-testing, etc. Additional examples of statistical techniques can also include non-parametric testing such as chi square testing, sign testing, rank type of testing, etc. Furthermore, additional types of deterministic hypothesis testing can be used. The deterministic model can determine a value for each alert component of the alert, such as p-values, confidence intervals, etc. Table 8 below illustrates p-values determined by the deterministic model of the data mining engine for the alert component of the negative alert "Alert4".

TABLE 8

Alert #4

| Metadata/Alert Component | Positive | Negative | P-value |
|---|---|---|---|
| Configuration Metadata1: Signal2 | 1 | 2 | 0.06 |
| Configuration Metadata2: Hierarchy1 | 4 | 2 | 0.03 |
| Algorithm Metadata1: Algorithm1 | 6 | 3 | 0.03 |
| Algorithm Metadata3: True | 6 | 3 | 0.03 |
| Algorithm Metadata2: High | 3 | 2 | 0.03 |

The process 300 includes the step of determining if the p-value for each alert component exceeds a threshold value (310). The data mining engine can compare the determined p-value for an alert component from the alert, e.g., from the deterministic model, to a threshold value. In some implementations, the threshold value may be set to a constant value, e.g., 0.05, or other appropriate values for statistical significance for a respective statistical test.

Upon determining the p-value of an alert component exceeds the threshold value, the process 300 includes the step of associating a negative feedback indicator to corresponding alert components with p-values exceeding the threshold value (312). By associating a negative feedback indicator to the respective alert component, the data mining engine identifies the alert component of the alert that has a significant likelihood of causing the alert to receive the respective feedback indicator. In some implementations, the data mining engine can associate a positive feedback indicator to corresponding alert components of the alerts, e.g., based on a comparison of statistical test values to a threshold value.

For example, Table 9 below shows associated indicators of the alert components for "Alert 4" with a threshold value equal to 0.05 and the respective p-values for the alert components. This step can be repeated for each of the alerts processed by the data mining engine, and alert components with p-values below the threshold value can be assigned a different feedback indicator. For example, the alert component for "Configuration Metadata1: Signal2" includes a p-value that exceeds the threshold, and therefore maintains the associated feedback indicator for the alert, e.g., negative feedback for "Alert 4". The alert components for "Alert 4" with p-values below the threshold value can have feedback indicators re-assigned with an opposite indicator, e.g., from positive to negative, or negative to positive.

TABLE 9

Alert #4

| Metadata/Alert Component | Positive | Negative | P-value | Feedback |
|---|---|---|---|---|
| Configuration Metadata1: Signal2 | 1 | 2 | 0.06 | Negative |
| Configuration Metadata2: Hierarchy1 | 4 | 2 | 0.03 | Positive |
| Algorithm Metadata1: Algorithm1 | 6 | 3 | 0.03 | Positive |
| Algorithm Metadata3: True | 6 | 3 | 0.03 | Positive |
| Algorithm Metadata2: High | 3 | 2 | 0.03 | Positive |

Upon determining that the p-value does not exceed the threshold value, the process 300 branches to determining if the number of iterations performed by the deterministic model exceed a total number of combinations of the alert components (314). The data mining engine can perform iterations of the deterministic model using the alert data, e.g., repeating the frequency determination in step 306, statistical testing in step 308, and threshold value comparison in step 310, by taking higher order combinations of alert components.

Upon determining if the number of iterations does not exceed the number of combinations, the process 300 includes taking higher combinations of alert components (318) and repeating steps of the process 300, including ending association of alert components (316) with the respective feedback indicators. For example, the data mining engine can take higher combinations of alert components upon determining that none of the alert components have a p-value exceed the threshold value. The data mining engine takes higher combinations of alerts by performing statistical testing for groupings of the alert components, e.g., two or more of alert components. In other words, the data mining engine can leverage the deterministic model to determine if a combination of the alert components drive the alert to receive a particular feedback indicator. In some implementations, the data mining engine can take perform all possible combinations, e.g., groupings, of alert components for statistical testing. In some implementations, the data mining engine can use a pre-defined value indicating a maximum order, e.g., grouping or number, of alert components to utilize for statistical testing.

Additionally, the data mining engine can generate a summary of the analyzed alerts in which alert components driving feedback indicator for the respective alerts are identified, as illustrated in Table 10. Although "Alert4", "Alert6", and "Alert8" were generated as negative alerts, e.g., alerts with negative feedback indicators, Table 10 illustrates feedback indicators for all signal components, e.g., with corresponding values, of the respective alerts. For example, the "CM1 Sig2" alert component, e.g., also referred to as "Configuration Metadata1: Signal 2" are assigned negative feedback indicators for "Alert4" and "Alert8", respectively. The assigned negative indicators for the alert component indicates that likelihood of the respective alert component driving the alert, e.g., the overall alert, to receive the negative feedback indicator. The remaining alert components receive positive indicators, as the determined p-values indicate that the remaining alert components do not have a statistically significant likelihood of causing the alert to receive the negative alert indicator.

TABLE 10

| Alert | CM1 Sig1 | CM1 Sig2 | CM1 Sig3 | CM2 Hier1 | CM2 Hier2 | AM1 Algo1 | AM2 High | AM2 Medium | AM3 True |
|---|---|---|---|---|---|---|---|---|---|
| 4 |   | − |   | + |   | + | + |   | + |
| 6 |   |   | + | + |   | + | + |   | + |
| 8 |   | − |   |   | + | + |   | + | + |

Figure 3B:
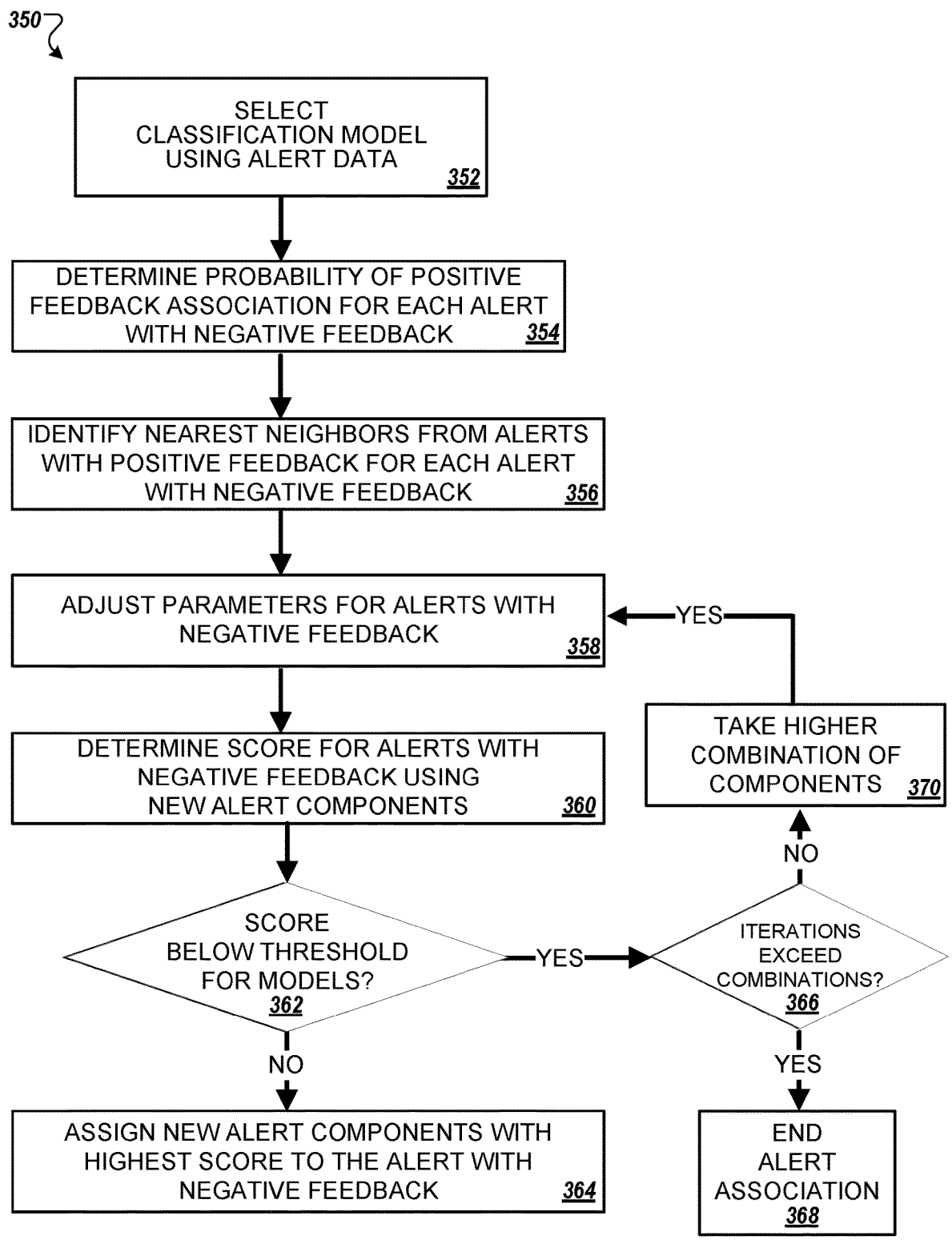

FIG. 3B is a diagram illustrating a data mining process 350 performed by a data mining engine (e.g., the data mining engine 128 described in FIG. 1 above) using a non-deterministic model. Briefly, the process 350 includes the steps of building the classification model using the feedback data (352), determining probability of positive feedback association for each alert with a negative feedback indicator (354), identifying nearest neighbors from alerts with positive feedback for each alert with a negative feedback indicator (356), and adjusting parameters and/or alert components for algorithms that generated the alerts with the negative feedback indicator (358). The process 350 also include determining a score for the alerts using the new/updated alert components (360) and determining that if the score each alert component is below a threshold value (362) and branches to associating a negative feedback indicator to corresponding alert components with scores exceeding the threshold value (364). Upon determining that the score does not exceed the threshold value, the process 350 branches to determining if the number of iterations performed by the non-deterministic model exceed a total number of combinations of the alert components (366). If the number of iterations does not exceed the number of combinations, the process 350 includes taking higher combinations of alert components (370) and repeating steps of the process 358, including ending association of alert components (368).

The process 350 includes the step of the data mining engine selecting the classification model using the alerts, which can include generating a summary of the alerts, alert components, and data related to the alert components such as metadata and data values (352). Table 11 below shows an example of input, e.g., processed alerts 126, that the data mining engine, e.g., data mining engine 128, can provide to a non-deterministic model, e.g., non-deterministic model 134, as described in FIG. 1 above. In some implementations, the data mining engine can build and/or update the non-deterministic model. Examples of classification models can include logistic regression, decision trees, random forest, gradient-boosted tree, multilayer perceptron, k-nearest networks, support vector machines, etc.

TABLE 11

| Alert | Configuration Metadata1 | Configuration Metadata2 | Configuration Metadata3 | Algorithm Metadata1 | Algorithm Metadata2 | Algorithm Metadata3 |
|---|---|---|---|---|---|---|
| 1 | Signal1 | Hierarchy1 | Increase | Algorithm1 | High | TRUE |
| 2 | Signal2 | Hierarchy1 | Increase | Algorithm1 | High | TRUE |
| 3 | Signal3 | Hierarchy2 | Decrease | Algorithm1 | Medium | TRUE |
| 4 | Signal2 | Hierarchy1 | Decrease | Algorithm1 | High | TRUE |
| 5 | Signal3 | Hierarchy2 | Increase | Algorithm1 | Medium | TRUE |
| 6 | Signal3 | Hierarchy1 | Decrease | Algorithm1 | High | TRUE |
| 7 | Signal1 | Hierarchy1 | Decrease | Algorithm1 | High | TRUE |
| 8 | Signal2 | Hierarchy2 | Decrease | Algorithm1 | Medium | TRUE |
| 9 | Signal1 | Hierarchy1 | Decrease | Algorithm1 | Medium | TRUE |
| ... | ... | ... | ... | ... | ... | ... |
| N | SignalN | HierarchyN | ... | AlgorithmN | ... | ... |

The process 350 includes the step of the non-deterministic model determining the probability of a positive feedback indicator being associated to each component of an alert that received a negative feedback indicator (354). In some implementations, the non-deterministic model can determine a probability of a particular feedback indicator, e.g., positive, negative, being associated to each component of an alert, based on the feedback indicator received for the alert. Table 12 below shows an example of the determined probabilities from the non-deterministic model indicating the likelihood that the alert component is associated with the positive feedback indicator.

TABLE 12

| Alert | CM1 | CM2 | CM3 | AM1 | AM2 | AM3 | Feedback | Probability |
|---|---|---|---|---|---|---|---|---|
| 1 | Sig1 | Hier1 | Increase | Algo1 | High | TRUE | 1 | 0.56 |
| 2 | Sig2 | Hier1 | Increase | Algo1 | High | TRUE | 1 | 0.83 |
| 3 | Sig3 | Hier2 | Decrease | Algo1 | Medium | TRUE | 1 | 0.70 |
| 4 | Sig2 | Hier1 | Decrease | Algo1 | High | TRUE | −1 | 0.48 |
| 5 | Sig3 | Hier2 | Increase | Algo1 | Medium | TRUE | 1 | 0.52 |
| 6 | Sig3 | Hier1 | Decrease | Algo1 | High | TRUE | −1 | 0.49 |
| 7 | Sig1 | Hier1 | Decrease | Algo1 | High | TRUE | 1 | 0.63 |
| 8 | Sig2 | Hier2 | Decrease | Algo1 | Medium | TRUE | −1 | 0.25 |
| 9 | Sig1 | Hier1 | Decrease | Algo 1 | Medium | TRUE | 1 | 0.56 |

The process 350 includes the step of the data mining engine identifying nearest neighbors from alerts with positive feedback for each alert with a negative feedback indicator (354). Referring to Table 12 above, "Alert 4", "Alert 6" and "Alert 8" include negative feedback indicators that are associated with the respective alert. Table 13 below shows the nearest neighbors for a negative alert, e.g., "Alert 6", that received positive feedback indicators, e.g., "Alert 3", "Alert 5", and "Alert 6".

TABLE 13

| Alert | CM1 | CM2 | CM3 | AM1 | AM2 | AM3 | Feedback |
|---|---|---|---|---|---|---|---|
| 3 | Sig3 | Hier2 | Decrease | Algo1 | Medium | TRUE | 1 |
| 5 | Sig3 | Hier2 | Increase | Algo1 | Medium | TRUE | 1 |
| 6 | Sig3 | Hier1 | Decrease | Algo1 | High | TRUE | −1 |

In some implementations, the data mining engine determines a profile of the nearest neighbors for negative alerts (356). Table 14 below shows a profile of the nearest neighbors for "Alert 6", by determining values for alert attributes of the positive alerts, e.g., "Alert 3" and "Alert 5", that are the mode value. In some implementations, the data mining engine determines the profile of the positive alerts nearest a respective negative alert can be determined by a voting process, e.g., simple majority.

TABLE 14

| Configuration Metadata1 | Configuration Metadata2 | Algorithm Metadata1 | Algorithm Metadata2 | Algorithm Metadata3 |
|---|---|---|---|---|
| Signal3 | Hierarchy2 | Algorithm1 | Medium | TRUE |

The process 350 includes the step of the data mining engine adjusting parameters of the alert components for algorithms that generated the negative alerts (358). The data mining engine can adjust parameters of alert components for the negative alert to the values of the alert components for the positive alert. The data mining engine can determine different combinations of parameter adjustments and adjust respective alert components for the alert. In some implementations, the data mining engine can identify a total number of unique combinations of alert components to adjust parameters for analyzing, e.g., by the non-deterministic model. Table 15 below illustrates the alert components of "Alert 6" that was originally associated as a negative alert, but with updated values for "Configuration Metadata2", e.g., from "Hierarchy1" to "Hiearchy2", and "Algorithm Metadata2", e.g., from "High" to "Medium", to match the profile of the neighboring positive alerts.

TABLE 15

| Configuration Metadata1 | Configuration Metadata2 | Algorithm Metadata1 | Algorithm Metadata2 | Algorithm Metadata3 |
|---|---|---|---|---|
| Signal3 | Hierarchy2 | Algorithm1 | Medium | TRUE |

The process 350 includes the step of the data mining engine determining a score for the alerts using the new/updated alert components (360). Table 16 below shows updated values for probability, e.g., as determined by the non-deterministic model, for "Alert 6" with updated values for alert attributes. For example, the first row of Table 16 shows updating the alert attribute for "Configuration Metadata2" from "Hierarchy1" to "Hierarchy2" for "Alert 6" provides a probability, e.g., a likelihood, value of 0.64 of the alert being associated with a positive feedback indicator. The second row of Table 16 shows updating the alert attribute for "Algorithm Metadata2" from "High" to "Medium" for "Alert 6" provides a probability, e.g., a likelihood, value of 0.51 of the alert being associated with a positive feedback indicator. Since the updated associated with the first row of values for alert components is the greatest value for likelihood, the data mining engine can select the respective parameters for the alert.

TABLE 16

| Configuration Metadata1 | Configuration Metadata2 | Algorithm Metadata1 | Algorithm Metadata2 | Algorithm Metadata3 | Probability |
|---|---|---|---|---|---|
| Signal3 | Hierarchy2 | Algorithm1 | High | TRUE | 0.64 |
| Signal3 | Hierarchy1 | Algorithm1 | Medium | TRUE | 0.51 |

The process 350 includes the step of the data mining engine determining that if the score each alert component is below a threshold value (362) and branches to associating a negative feedback indicator to corresponding alert components with scores exceeding the threshold value (364). Upon determining the score is above the threshold, e.g., the likelihood for positive feedback association increases, the data mining engine can assign the updated values for alert attributes to the alert, e.g., updating one or more attributes per iteration of the non-deterministic model. The data mining engine can determine that the score, e.g., the probability determined by the non-deterministic model is below the threshold value.

Upon determining that the score does not exceed the threshold value, the process 350 branches to determining if the number of iterations performed by the non-deterministic model exceed a total number of combinations of the alert components (366). The data mining engine can perform iterations of the non-deterministic model using the alert data, e.g., repeating the parameter adjustment in step 358, scoring the alerts in step 360, and threshold value comparison in step 360, by taking higher order combinations of alert components.

If the number of iterations does not exceed the number of combinations, the process 350 includes taking higher combinations of alert components (370) and repeating steps of the process 358, including ending association of alert components (368). As discussed with reference to FIG. 3A above, the data mining engine can take higher combinations of alert components upon determining that the score does not exceed the threshold when adjusting the alert components. The data mining engine takes higher combinations of alerts by processing the updated alert components using the non-deterministic model, e.g., computing probabilities of positive feedback indication and re-scoring the alerts.

The non-deterministic model (e.g., non-deterministic model 134) can perform many training updates based on different training examples provided e.g., collecting alert data and components of alerts. The non-deterministic model can perform many iterations e.g., millions, of training to gradually and incrementally learn how to make improved associations of alert components to the respective feedback indicator of the alert. Through the collection of training data from various alerts, the non-deterministic model can improve the accuracy of the alerts and determine subsets of alerts (e.g., output alerts 144) across different signal types, algorithms, and metadata, e.g., including previously unseen signals and alerts.

In some implementations, the non-deterministic model can perform training to determine how to adjust parameters based on ground truth data. For example, the non-deterministic model can predict a likelihood of an alert component being associated with a type of feedback indicator, e.g., user-generated feedback, a flag indicating positive or negative association. In this example, if the estimated likelihood of associated alert components exceeds a threshold value, e.g., an error value, the non-deterministic model can adjust model parameters and repeat processing until the predicted likelihood of association with the respective feedback indicator is within the threshold value from the ground truth likelihood of association. In another example, if the determined indicator of the alert component is incorrect, then the non-deterministic model can identify features, e.g., higher order combinations of alert components, of the alerts and repeat training until the correct indicator is determined for the alert component, e.g., by adjusting parameters. As an example, an adjustment of the non-deterministic model can include adjusting the values of weights and biases for nodes in one or more neural networks. The data mining engine 128 can adjust parameters of the non-deterministic model to improve identification of alert components driving particular feedback indicator, e.g., perform additional training to improve likelihoods of associating and/or identifying alert components to the respective feedback indicator of the alert.

In some implementations, the non-deterministic model 134 can generate rules to provide to the computing system 106 to alter the process of generating alerts, e.g., adjusting parameters for algorithms of the computing devices 108-1-108-N. For example, the rules can include adjusting thresholds for changes in signal values that trigger generation and display of an alert, i.e., controlling sensitivity to generate and/or provide alerts. By adapting thresholds for alert generation, the non-deterministic model 134 of the data mining engine 128 can reduce volumes of extraneous alerts and reduce processing loads of the computing platform 114.

In some implementations, the non-deterministic model can adjust a penalty parameter, e.g., for training the non-deterministic model to improve identification of alert components driving alerts to receive respective feedback indicators. In some implementations, parameters adjusted in non-deterministic model can be learned e.g., by a neural network that can include the non-deterministic model. In some implementations, model parameters adjusted for the non-deterministic model can include coefficients or weights of a neural network, biases of a neural network, and cluster centroids in clustering networks. In some implementations, hyperparameters e.g., parameters to adjust learning of the non-deterministic model can be adjusted for training the non-deterministic model. Hyperparameters can include a test-train split ratio, learning rates, selection of optimization algorithms, selection of functions e.g., activation, cost, or loss functions, a number of hidden layers, a dropout rate, a number of iterations, a number of clusters, a pooling size, a batch size, and a kernel or filter size in convolutional layers.

The non-deterministic model can use any appropriate algorithm such as backpropagation of error or stochastic gradient descent for training. Through many different training iterations, based on training data and examples provided to the non-deterministic model the non-deterministic model learns to accurately determine likelihoods of alert components driving respective feedback indication of the alert. The non-deterministic model can be trained on time-series signal data over a time period e.g., hours, days, weeks, and so on. The non-deterministic model is evaluated for error and accuracy over a validation set. The model training continues until either a timeout occurs, e.g., typically several hours, or a predetermined error or accuracy threshold is reached. In some implementations, an ensemble approach of models can be implemented by the non-deterministic model to improve overall accuracy of alert component association. Model training and re-training of the non-deterministic model can be performed repeatedly at a pre-configured cadence e.g., once a week, once a month, and if new data is available in the object store then it automatically gets used as part of the training. The data pipeline to obtain new data remains the same as described above.

In some implementations, the non-deterministic model can include feed-forward neural networks with multiple feed-forward layers. Each feed-forward neural network can include multiple fully-connected layers, in which each fully-connected layer applies an affine transformation to the input to the layer, i.e., multiplies an input vector to the layer by a weight matrix of the layer. Optionally, one or more of the fully-connected layers can apply a non-linear activation function e.g., ReLU, logistic, hyperbolic tangent, to the output of the affine transformation to generate the output of the layer. In some implementations, the non-deterministic model can include regression e.g., linear, logistic, polynomial, ridge, LASSO techniques.

The non-deterministic model can perform of variety of training techniques to improve estimation of alert component association to feedback indicators in a computing platform environment, including supervised and unsupervised learning. In some examples, the non-deterministic model performs hybrid-learning techniques to improve alert component association. The training of the non-deterministic model can be performed using obtained ground truth data that includes known alert component associations, coupled with feedback indicators of the respective alerts. The non-deterministic model can adjust one or more weights or parameters to match estimates or predictions from the non-deterministic model to the ground truth data. In some implementations, the non-deterministic model includes one or more fully or partially connected layers. Each of the layers can include one or more parameter values indicating an output of the layers. The layers of the non-deterministic model can generate statistical likelihoods for alert components of alerts in a computing platform environment, which can be used to perform one or more control actions in the computing platform environment, e.g., adjusting alerts, filtering alerts, re-generating alerts, providing alerts for display, transmitting the alerts.

In some implementations, each of the processes 300 and 350 can be performed by a respective model (e.g., deterministic model, non-deterministic model) iteratively until a threshold value is met, e.g., based on a score. In some implementations, iterative processing performed by the models can be performed by taking higher combinations of alert components when associating the feedback for the alert to the respective alert components. The models can also update parameters when performing statistical testing and/or machine learning techniques, e.g., thereby improving the likelihood of association for alert components of the alert to the respective feedback indicator of the alert. In some implementations, each of the processes 300 and 350 can be performed until no further alert components of the alert are unassociated to the feedback indicator of the alert. In other words, the models can perform iterations until each alert component is associated with a likelihood of causing the alert to receive the respective feedback indicator.

Figure 4:
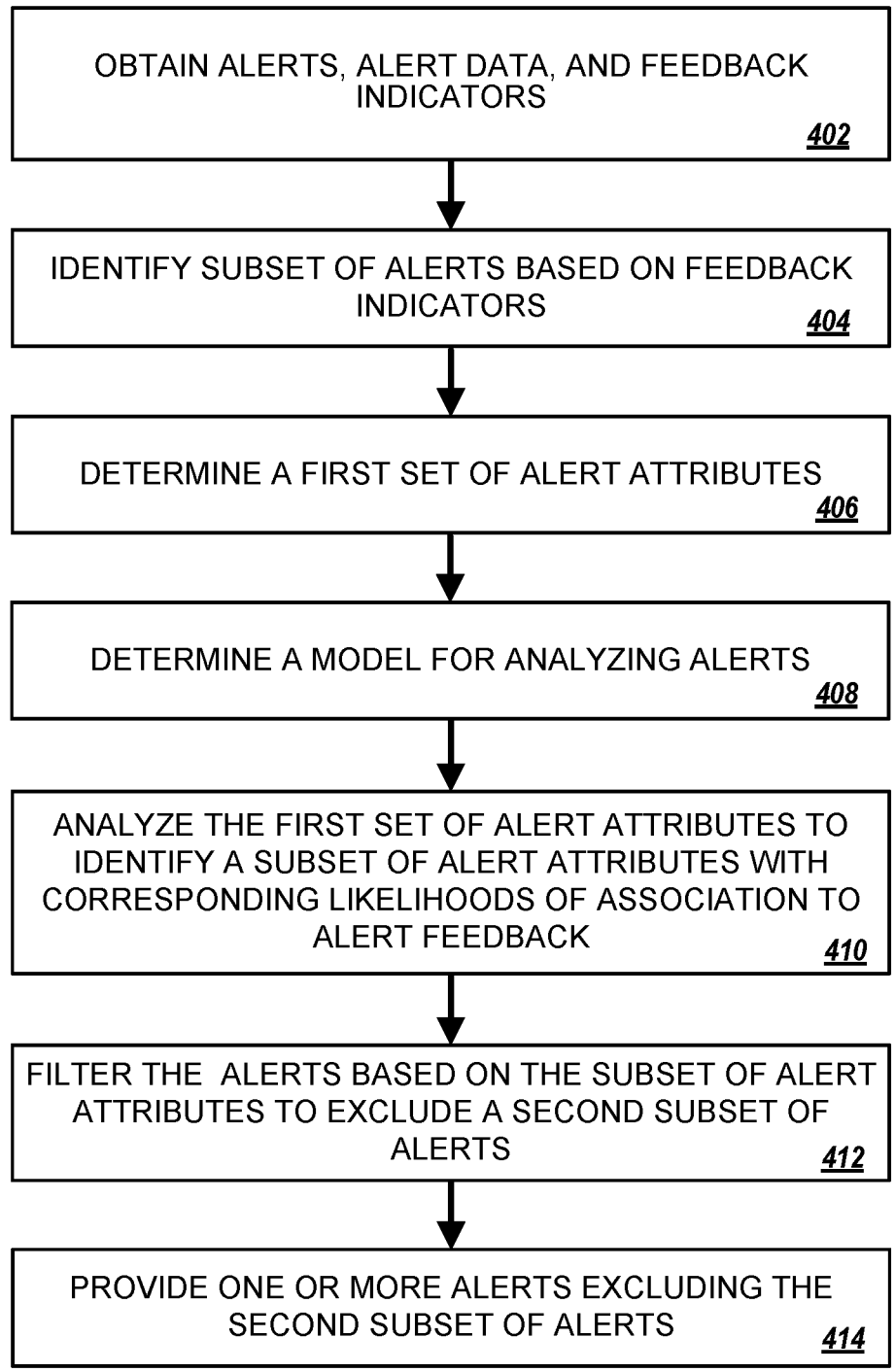
FIG. 4 is a flow diagram showing an example process for analyzing and filtering alerts in a computing platform.

FIG. 4 is a flow diagram showing an example process 400 for analyzing and filtering alerts in a computing platform. Briefly, the process 400 includes the steps of obtaining alerts, alert data, and feedback indicators (402), identifying subset of alerts based on feedback indicators (404), determining a first set of alert attributes (406), determining a model for analyzing alerts (408), and analyzing the first set of alert attributes to identify a subset of alert attributes with corresponding likelihoods of association to the alert feedback (410). The process 400 also includes filtering alerts based on the subset of alert attributes to exclude a second subset of alerts (412) and providing one or more alerts excluding the second subset of alerts (414).

The process 400 includes the data mining engine, e.g., data mining engine 128 (referring to FIG. 1), obtaining alerts, alert data, and feedback indicators (402). The data mining engine can receive alerts from a computing system that can also include multiple computing devices. The alerts represent anomalies detected in signals, such as values of signal attributes exceeding a threshold value, containing a particular flag and/or type of attribute, a combination of attributes, or some combination herein. The alerts can include feedback indicators provided by algorithms of the computing devices, but can also be provided by input from users of the computing system and/or the respective computing devices.

The process 400 includes the data mining engine identifying subset of alerts based on feedback indicators (404). The data mining engine can identify a subset of alerts, each with a negative feedback indicator, e.g., negative alerts, to identify alert attributes (also referred to as alert components) of each alert in the subset of alerts. In some implementations, the data mining engine can identify a subset of alerts with a positive feedback indicator, e.g., positive alerts.

The process 400 includes the data mining engine determining a first set of alert attributes (406). The alert attributes can include narratives that describe a signal and signal characteristics, e.g., type of signal, algorithm that generated that signal, trends. The alert attributes can include metadata including data related to the signal, algorithms that generated the signal, an identification of the observational layer of the signal in which the anomaly was detected, characteristics of anomaly in the signal, etc.

The process 400 includes the data mining engine determining a model for analyzing alerts (408). For example, the data mining engine can determine a type of model for analyzing alerts by performing process 200 based on the number of feedback indicators obtained for alerts relative to the total number of alerts exceeds a threshold value, e.g., step 210 of process 200. The type of model selected by the data mining engine can include deterministic models, e.g., leveraging one or more statistical techniques, as well as non-deterministic models, e.g., machine learning modelling techniques.

The process 400 includes the data mining engine analyzing the first set of alert attributes to identify a subset of alert attributes with corresponding likelihoods of association to the alert feedback (410). The data mining engine can determine a likelihood for each attribute, the likelihood representing a probability that a respective alert attribute causes the alert to receive the respective feedback indicator of the alert.

The process 400 includes the data mining engine filtering alerts based on the subset of alert attributes to exclude a second subset of alerts (412). The data mining engine can filter alerts based on the priority of the alert, resulting in the second subset of alerts. For example, the data mining engine can determine that the subset of alerts that received a negative association can be incorrectly associated based on the analyzed data of the alert data. In some implementations, the data mining engine can determine parameters to adjust generation of the subset of alerts, based on the analyzed subset of alert attributes.

The process 400 includes the data mining engine providing one or more alerts excluding the second subset of alerts (414). The data mining engine can provide the filtered set of alerts to computing systems, devices, and other computing platforms. In some implementations, the alerts can be provided for display, through a computing device, mobile device, etc.

Figure 5:
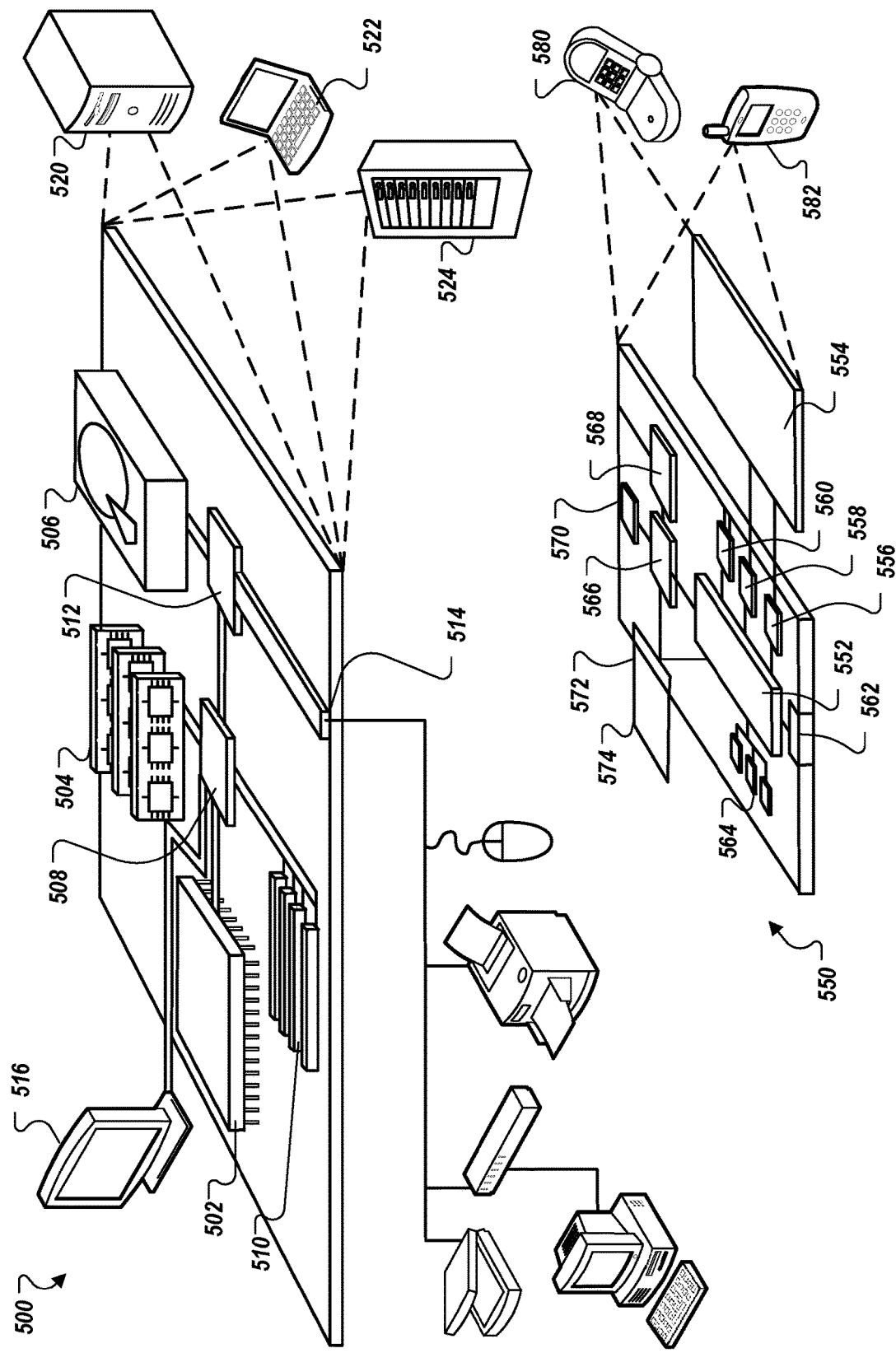
FIG. 5 is a diagram illustrating an example of a computing system used for grouping and bundling services of a mainframe computer.

FIG. 5 is a diagram illustrating an example of a computing system used for a data mining engine, e.g., the data mining engine 128, as described in FIGS. 1-4 above. The computing system includes computing device 500 and a mobile computing device 550 that can be used to implement the techniques described herein. For example, one or more components of the computing platform environment 100 could be an example of the computing device 500 or the mobile computing device 550, such as a computing system, e.g., server device 102, computing devices 108.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a Graphical User Interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 502 is a single threaded processor. In some implementations, the processor 502 is a multi-threaded processor. In some implementations, the processor 502 is a quantum computer.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine readable mediums (for example, the memory 504, the storage device 506, or memory on the processor 502). The high-speed interface 508 manages bandwidth-intensive operations for the computing device 500, while the low-speed interface 512 manages lower bandwidth-intensive operations. Such allocation of functions is an example only. In some implementations, the high speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may include one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (nonvolatile random access memory). In some implementations, instructions are stored in an information carrier such that the instructions, when executed by one or more processing devices (e.g., processor 552), perform one or more methods, such as those described above. The instructions can also be stored by one or more storage devices, such as one or more computer or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry in some cases. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 3G/4G cellular, among others. Such communication may occur, for example, through the transceiver 568 using a radio frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, among others) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

In conclusion, these techniques described herein will improved the computational efficiency and performance of computing alerts by reducing extraneous, e.g., inaccurate, alerts indicating changes in signals across one or more computing systems. Computing systems and platforms are utilized in many industries relying on vast amounts of data, and thereby generate significant carbon emissions, e.g., through the operations of data servers and computing devices. The consumption layer of a computing platform can provide data representing signal anomalies that indicate degraded performance in the computing system. The alerts provided by the consumption layer can indicate sources of the degraded performance, but inaccurate identification and generation of the alerts can render the alerts unhelpful when adopting, e.g., utilizing, the consumption layer. Improving the accuracy and adoption rate of alerts generated by the consumption layer results in improved efficiency of the computing system, thereby reducing extraneous processing loads. Reduction in processing loads of computing platforms, systems, and devices can significantly reduce carbon emissions, particularly as these computational techniques become prominent across industries with large volumes of data, signals, etc. By reducing carbon emissions, the widespread adoption of the these techniques can help mitigate the effects of climate change.

A number of implementations have been described. Nevertheless, it will be understood that various modifications may be made without departing from the spirit and scope of the disclosure. For example, various forms of the flows shown above may be used, with steps re-ordered, added, or removed.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for tracking and prioritizing observation data across multiple observational hierarchies in a computing platform, the method comprising:
    obtaining one or more alerts and feedback indicators corresponding to at least one alert of the one or more alerts, each of the one or more alerts representing a portion of the observation data in a computing system, the computing system connected to the computing platform comprising a data mining engine, and each of the feedback indicators indicating a positive or negative association of a respective alert of the at least one alert for the represented portion of the observation data, wherein the observation data includes at least one of data requests, latency, traffic, processing loads, server requests;
    identifying, based on the feedback indicators corresponding to the at least one alert, a first subset of the one or more alerts that correspond to a subset of the observation data with negative feedback;
    determining a first set of alert attributes that include metadata related to the subset of the observation data for the first subset of the one or more alerts;
    determining, based on the feedback indicators and by a data mining engine, a model from a plurality of models of the data mining engine that is configured to analyze a respective alert attribute of the first set of alert attributes for the observation data represented by the one or more alerts;
    analyzing, by the model of the data mining engine, the first set of alert attributes to identify a subset of the first set of alert attributes with corresponding likelihoods representing that one or more alert attributes of the first set of alert attributes caused the negative association of the respective alert represented by the respective portion of the observation data;
    filtering, based on the subset of alert attributes and by the data mining engine, the one or more alerts to exclude a second subset of the one or more alerts with the highest likelihood of the negative association; and
    providing, for output of the computing platform, the one or more alerts that exclude the second subset of the one or more alerts.

2. The computer-implemented method of claim 1, wherein determining the model further comprises:
    determining a count of the at least one alert, the count of the at least one alert indicating a number of the one or more alerts with respective feedback indicators relative to the total number of the one or more alerts;
    comparing the count of the at least one alert to a threshold value; and
    based on the comparison of the count of the at least one alert to the threshold value, selecting the model from the plurality of models.

3. The computer-implemented method of claim 1, the plurality of models further comprising at least one model that applies one or more of (i) statistical testing techniques, or (ii) machine learning techniques, to the first set of alert attributes to identify the subset of alert attributes.

4. The computer-implemented method of claim 1, the first set of alert attributes further comprises metadata related to the respective portion of the observation data.

5. The computer-implemented method of claim 1, further comprising:
    identifying one or more algorithms that generated the first subset of the one or more alerts from the subset of the observation data; and
    adjusting parameters of the one or more algorithms based on the subset of alert attributes and their likelihoods.

6. The computer-implemented method of claim 1, wherein analyzing the first set of alert attributes further comprises:
    assigning a feedback indicator of the feedback indicators of the respective alert to each alert attribute of the first set of alert attributes;
    determining a frequency for each type of the feedback indicator for the first set of alert attributes; and
    determining a statistical likelihood of each alert attribute of the first set of alert attributes receiving a respective type of the feedback indicator.

7. The computer-implemented method of claim 6, further comprising:
    comparing the statistical likelihood of each alert attribute of the first set of alert attributes to a threshold value; and
    assigning the feedback indicator to the first set of alert attributes based on the comparison.

8. The computer-implemented method of claim 6, further comprising:
    determining that the statistical likelihood for any of the first set of alert attributes does not exceed the threshold value;
    determining a grouping of two or more alert attributes of the first set of alert attributes; and
    performing one or more statistical techniques using the grouping to identify a new statistical likelihood of the grouping of alert attributes receiving the respective type of the feedback indicator.

9. The computer-implemented method of claim 6, wherein the threshold value represents a likelihood indicating an alert of the at least one alert receiving a respective feedback indicator of the feedback indicators.

10. The computer-implemented method of claim 1, further comprising:
    determining a probability of a positive feedback indicator being associated to each alert of the at least one alert receiving a negative feedback indicator;
    identifying one or more neighbouring alerts with positive feedback indicators for each alert of the at least one alert that received the negative feedback indicator;
    determining a profile representing one or more common values of alert attributes of the one or more neighbouring alerts; and
    adjusting one or more attributes of each alert of the one or more neighbouring alerts that received the negative feedback indicator to the one or more common values from the profile.

11. The computer-implemented method of claim 10, further comprising:
    determining a score for each alert of the one or more neighbouring alerts with the one or more adjusted attributes;
    comparing the score for each alert of the one or more neighbouring alerts with the one or more adjusted attributes to a threshold value; and
    assigning the negative feedback indicator to the one or more attributes based on the comparison of the score and the threshold value for each alert of the one or more neighbouring alerts.

12. The computer-implemented method of claim 11, further comprising:
    determining that the score for an alert of the one or more neighbouring alerts with the one or more adjusted attributes does not exceed the threshold value;
    determining a grouping of two or more alert attributes of the alert; and
    performing one or more machine learning techniques using the grouping to determine a new score for the grouping of alert attributes receiving a respective type of a feedback indicator of the feedback indicators.

13. A system for tracking and prioritizing observation data across multiple observational hierarchies in a computing platform, the system comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    obtaining one or more alerts and feedback indicators corresponding to at least one alert of the one or more alerts, each of the one or more alerts representing a portion of observation data in a computing system, the computing system connected to the computing platform comprising a data mining engine, and each of the feedback indicators indicating a positive or negative association of a respective alert of the at least one alert for the represented portion of the observation data, wherein the observation data includes at least one of data requests, latency, traffic, processing loads, server requests;
    identifying, based on the feedback indicators corresponding to the at least one alert, a first subset of the one or more alerts that correspond to a subset of the observation data with negative feedback;
    determining a first set of alert attributes that include metadata related to the subset of the observation data for the first subset of the one or more alerts;
    determining, based on the feedback indicators and by a data mining engine, a model from a plurality of models of the data mining engine that is configured to analyze a respective alert attribute of the first set of alert attributes for the observation data represented by the one or more alerts;
    analyzing, by the model of the data mining engine, the first set of alert attributes to identify a subset of the first set of alert attributes with corresponding likelihoods representing that one or more alert attributes of the first set of alert attributes caused the negative association of the respective alert represented by the respective portion of the observation data;
    filtering, based on the subset of alert attributes and by the data mining engine, the one or more alerts to exclude a second subset of the one or more alerts with the highest likelihood of the negative association; and
    providing, for output of the computing platform, the one or more alerts that exclude the second subset of the one or more alerts.

14. The system of claim 13, wherein determining the model further comprises:
    determining a count of the at least one alert the count of the at least one alert indicating a number of the one or more alerts with respective feedback indicators relative to the total number of the one or more alerts;
    comparing the count of the at least one alert to a threshold value; and
    based on the comparison of the count of the at least one alert to the threshold value, selecting the model from the plurality of models.

15. The system of claim 13, the plurality of models further comprising at least one model that applies one or more of (i) statistical testing techniques, or (ii) machine learning techniques, to the first set of alert attributes to identify the subset of alert attributes.

16. The system of claim 13, the first set of alert attributes further comprises metadata related to the respective portion of the observation data.

17. The system of claim 13, further comprising:
    identifying one or more algorithms that generated the first subset of the one or more alerts from the subset of the observation data; and
    adjusting parameters of the one or more algorithms based on the subset of alert attributes and their likelihoods.

18. The system of claim 13, wherein analyzing the first set of alert attributes further comprises:
    assigning a feedback indicator of the feedback indicators of the respective alert to each alert attribute of the first set of alert attributes;
    determining a frequency for each type of the feedback indicator for the first set of alert attributes; and
    determining a statistical likelihood of each alert attribute of the first set of alert attributes receiving a respective type of the feedback indicator.

19. The system of claim 13, further comprising:
    determining a probability of a positive feedback indicator being associated to each alert of the at least one alert receiving a negative feedback indicator;

identifying one or more neighbouring alerts with positive feedback indicators for each alert of the at least one alert that received the negative feedback indicator;

determining a profile representing one or more common values of alert attributes of the one or more neighbouring alerts; and adjusting one or more attributes of each alert of the one or more neighbouring alerts that received the negative feedback indicator to the one or more common values from the profile.

20. A non-transitory, computer-readable medium storing one or more instructions executable by a computer system to perform operations for tracking and prioritizing observation data across multiple observational hierarchies in a computing platform, comprising:

obtaining one or more alerts and feedback indicators corresponding to at least one alert of the one or more alerts, each of the one or more alerts representing a portion of observation data in a computing system, the computing system connected to the computing platform comprising a data mining engine, and each of the feedback indicators indicating a positive or negative association of a respective alert of the at least one alert for the represented portion of the observation data, wherein the observation data includes at least one of data requests, latency, traffic, processing loads, server requests;

identifying, based on the feedback indicator corresponding to the at least one alert, a first subset of the one or more alerts that correspond to a subset of the observation data with negative feedback;

determining a first set of alert attributes that include metadata related to the subset of the observation data for the first subset of the one or more alerts;

determining, based on the feedback indicators and by a data mining engine, a model from a plurality of models of the data mining engine that is configured to analyze a respective alert attribute of the first set of alert attributes for the observation data represented by the one or more alerts;

analyzing, by the model of the data mining engine, the first set of alert attributes to identify a subset of the first set of alert attributes with corresponding likelihoods representing that one or more alert attributes of the first set of alert attributes caused the negative association of the respective alert represented by the respective portion of the observation data;

filtering, based on the subset of alert attributes and by the data mining engine, the one or more alerts to exclude a second subset of the one or more alerts with the highest likelihood of the negative association; and providing, for output of the computing platform, the one or more alerts that exclude the second subset of the one or more alerts.

* * * * *